United States Patent [19]

Soma et al.

[11] 4,265,803

[45] May 5, 1981

[54] POLYMERS CONTAINING POLYALKYLPIPERIDINES AND USE THEREOF AS STABILIZERS

[75] Inventors: Nobuo Soma; Syoji Morimura; Takao Yoshioka; Tomoyuki Kurumada, all of Hiromachi, Japan

[73] Assignee: Sankyo Company Limited, Tokyo, Japan

[21] Appl. No.: 931,535

[22] Filed: Aug. 7, 1978

[30] Foreign Application Priority Data

Aug. 8, 1977 [JP] Japan ............................. 52/94808

[51] Int. Cl.³ ................... C08L 23/00; C08G 73/06; C07D 221/00; C07D 221/20

[52] U.S. Cl. .......................... 260/45.8 NZ; 528/289; 546/19; 528/103; 528/100; 546/20; 528/117; 528/118; 546/216; 528/339; 528/341; 546/242; 528/361; 528/420; 546/186; 528/421; 525/109; 546/188; 525/114; 525/115; 546/190; 525/411; 525/417; 546/191; 525/424; 525/440; 525/113

[58] Field of Search .............. 260/45.8 N, 45.8 NP; 528/289; 546/188, 242

[56] References Cited

U.S. PATENT DOCUMENTS

| 3,542,729 | 11/1970 | Murayama et al. ............... 260/45.8 |
| 3,640,928 | 2/1972 | Murayama et al. ............ 260/23 XA |
| 3,684,765 | 8/1972 | Matsui et al. .................. 260/45.8 N |
| 3,705,126 | 12/1972 | Matsui et al. .................. 260/45.8 N |
| 3,840,494 | 10/1974 | Murayama et al. ............ 260/45.8 N |
| 3,898,303 | 8/1975 | Murayama et al. ............. 260/880 R |
| 3,899,464 | 8/1975 | Murayama et al. ......... 260/45.8 NZ |
| 3,904,581 | 9/1975 | Murayama et al. ............ 260/45.8 N |
| 3,940,363 | 2/1976 | Murayama et al. ............ 260/45.8 N |
| 3,941,744 | 3/1976 | Murayama et al. ............ 260/45.8 N |
| 3,974,127 | 8/1976 | Tanikella et al. .................. 260/75 N |
| 3,993,655 | 11/1976 | Rasberger et al. .............. 260/293.64 |
| 4,005,094 | 1/1977 | Murayama et al. ............ 260/293.66 |
| 4,021,432 | 5/1977 | Holt et al. ..................... 260/293.64 |
| 4,055,536 | 10/1977 | Soma et al. .................... 260/45.8 N |
| 4,061,616 | 12/1977 | Murayama et al. ............ 260/45.8 N |
| 4,075,165 | 2/1978 | Soma et al. .................... 260/45.8 N |

FOREIGN PATENT DOCUMENTS 1401924 8/1975 United Kingdom .

*Primary Examiner*—Hosea E. Taylor
*Attorney, Agent, or Firm*—Toren, McGeady and Stanger

[57] ABSTRACT

The invention entitled "Polymers containing polyalkylpiperidines and use thereof as stabilizers" provides a class of polymers in which groups containing sterically hindered polyalkylpiperidines are linked in the main chain of the polymers via bridging members containing 2-hydroxy-1,3-trimethylene groups.

The polymers show superior stabilizing effects for various synthetic polymers such as polyolefins against degradation thereof induced by light and/or heat. The polymers have advantages, as compared with known stabilizer compounds, that they hardly volatile upon processing with heating or during storage of articles containing thereof, and that they are resistant to extraction with solvents from articles containing thereof.

27 Claims, No Drawings

POLYMERS CONTAINING POLYALKYLPIPERIDINES AND USE THEREOF AS STABILIZERS

BACKGROUND OF THE INVENTION

The present invention relates to novel polymers containing sterically hindered polyalkylpiperidines which are useful as stabilizers for synthetic polymers.

It has been known that polyalkylpiperidine derivatives in which 1- and/or 4-positions are substituted are effective polymer stabilizers against degradation thereof induced by light and/or heat. For example, 4-spirohydantoins of 2,2,6,6-tetramethylpiperidine or 2,6-diethyl-2,3,6-trimethylpiperidine are disclosed in U.S. Pat. Nos. 3,542,729; 3,705,126; 3,941,744; 4,005,094; 3,898,303; and German Offenlegungsschrift No. 26 23 464: amino derivatives are disclosed in U.S. Pat. Nos. 3,684,765; 3,904,581; and German Offenlegungsschrift No. 26 21 870: esters, ethers and carbamates of 4-ol are disclosed in U.S. Pat. Nos. 3,640,928; 3,840,494; 4,021,432; 3,940,363; 3,993,655; 4,075,165 and German Offenlegungsschrift No. 26 47 452: ketals of 4-oxo compound are disclosed in U.S. Pat. No. 3,899,464; 3,940,363; and German Offenlegungsschrift No. 26 21 855: and pinacol type derivatives are disclosed in U.S. Pat. Nos. 4,061,616; 4,055,536 and Japanese Patent Provisional Publication No. 51-145548, respectively.

Furthermore, polymers containing 4-amino-polyalkylpiperidines as the side chains are proposed in German Offenlegungsschriften Nos. 26 11 208; 26 36 144; and 26 36 130.

DETAILED DESCRIPTION OF INVENTION

The invention provides polymers in which groups containing polyalkylpiperidines represented by the general formulae:

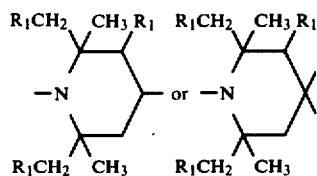

(wherein, $R_1$ represents hydrogen atom or methyl group) are linked in the main chain via bridging members containing groups having a formula

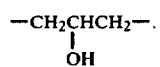

The polymers show superior stabilizing effect for various polymeric materials against light- and heat degradation thereof, with less vaporization and exudation therefrom.

The polymers of the invention containing polyalkylpiperidines are represented by the following formula (I):

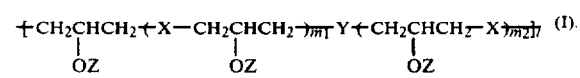

In the above formula, l represents an integer of from 2 to 50, preferably 2–10, most preferably 2–6.

Both $m_1$ and $m_2$ represent 0, or one of them represents 1 and another represents 0.

X represents a group of formula

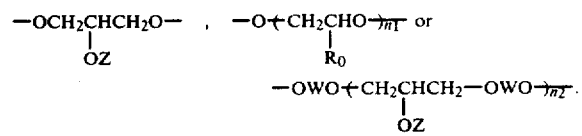

$R_0$ represents hydrogen atom or methyl group, preferably hydrogen atom.

$n_1$ represents an integer of from 1 to 10, preferably 1.

$n_2$ represents 0 or an integer of from 1 to 10, preferably 0.

W represents a group of formula

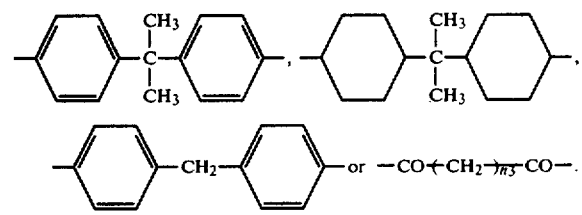

$n_3$ represents an integer of from 1 to 10, preferably 4 to 10, most preferably 4. As such a group are mentioned, for example, malonyl, succinyl, adipoyl, suberoyl, sebacoyl or decane-1,10-dicarbonyl.

W further represents a group of formula

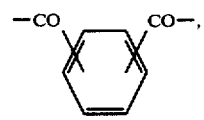

e.g. isophthaloyl or terephthaloyl, preferably phthaloyl, or a group of formula

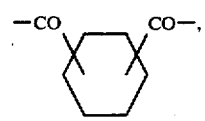

e.g. cyclohexane-1,2-dicarbonyl.

Y represents, when both $m_1$ and $m_2$ are 0, one of the following formulae (II) to (IV).

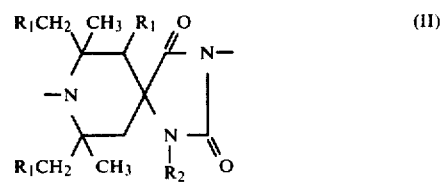

in which:

$R_1$ represents hydrogen atom or methyl group, preferably hydrogen atom.

$R_2$ represents hydrogen atom or an alkyl group having from 1 to 18 carbon atoms, e.g. methyl, ethyl, n-propyl, n-butyl, octyl, dodecyl or octadecyl, particularly methyl. Preferred $R_2$ is hydrogen atom.

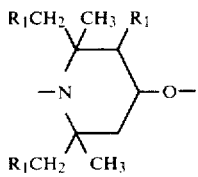

(III)

in which: $R_1$ has the meaning defined above.

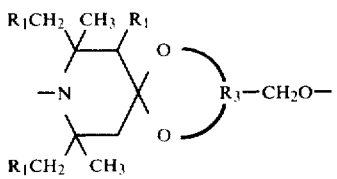

(IV)

in which:
$R_1$ has the meaning defined above.
$R_3$ represents a group of formula

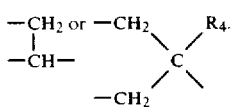

$R_4$ represents methyl group or ethyl group.

Y represents, when one of $m_1$ and $m_2$ is 1 and another is 0, a group of the following formulae (V) to (XI).

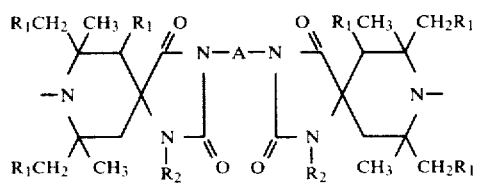

(V)

in which:
$R_1$ and $R_2$ have the meanings defined above.

A represents an alkylene group having from 2 to 12, preferably 2 to 6, most preferably 6 carbon atoms, e.g. ethylene, tetramethylene, hexamethylene, octamethylene, decamethylene or dodecamethylene; a xylylene group, e.g. o-, m- or p-xylylene, preferably p-xylylene; a group of formula

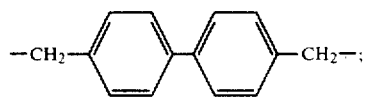

a group of formula $—CH_2COO—R_5—OCOCH_2—$ in which $R_5$ is an alkylene group having from 2 to 8 carbon atoms, e.g. ethylene, tetramethylene, hexamethylene or 2-ethyl-1,6-hexylene, preferably ethylene; a group of formula

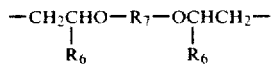

in which $R_6$ represents hydrogen atom, methyl group or phenyl group, preferably hydrogen atom, and $R_7$ represents an aliphatic, aromatic or alicyclic diacyl group having up to 12 carbon atoms, for example, an alkanedicarbonyl having from 4 to 12 carbon atoms and optionally interrupted by sulfur such as malonyl, succinyl, adipoyl, sebacoyl, decane-1,10-dicarbonyl or 3,3'-thiodipropionyl, phthaloyl, isophthaloyl, terephthaloyl or cyclohexane-1,4-dicarbonyl; or a group of formula

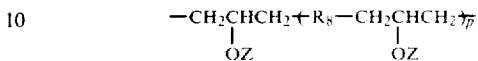

in which p is 0 or 1, preferably 1, $R_8$ has the same meaning as above-defined X, and Z has the meaning defined below.

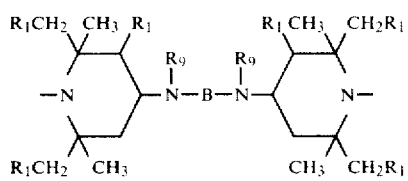

(VI)

in which:
$R_1$ has the meaning defined above.

$R_9$ represents an alkyl group having from 1 to 18, preferably 1 to 8 carbon atoms, e.g. methyl, ethyl, n-propyl, n-butyl, n-octyl, 2-ethylhexyl, undecyl or octadecyl; a phenyl group; benzyl group; cyclohexyl group; or an aliphatic, aromatic araliphatic or alicyclic acyl group having up to 18 carbon atoms, for example, an alkanoyl group having from 2 to 18 carbon atoms such as acetyl, propionyl, hexanoyl, octanoyl, 2-ethylhexanoyl, lauroyl or stearoyl, benzoyl, toluoyl or 3-(3,5-di-tert-butyl-4-hydroxyphenyl)propionyl. The most preferred $R_9$ is an alkyl group having from 1 to 4 carbon atoms and acetyl.

B represents an alkylene group having from 2 to 10, preferably 2 to 6 carbon atoms, e.g. ethylene, tetramethylene, hexamethylene, octamethylene or decamethylene; a xylylene group, e.g. o-, m- or p-xylylene, preferably p-xylylene; a group of formula

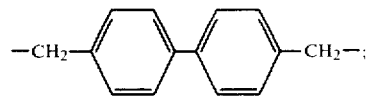

a group of formula $—CH_2COO—R_5—OCOCH_2—$ in which $R_5$ has the meaning defined above; a group of formula

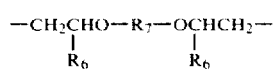

in which $R_6$ and $R_7$ have the meanings defined above; or a group of formula

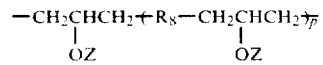

in which $R_8$ and p have the meanings defined above and Z has the meaning defined below.

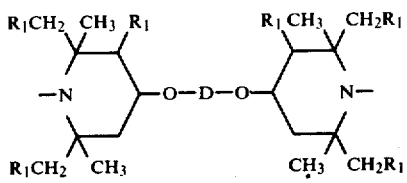
(VII)

in which:

$R_1$ has the meaning defined above.

D represents an aliphatic, aromatic, araliphatic or alicyclic diacyl group having up to 36 carbon atoms, for example, as described in $R_7$, an alkanedicarbonyl group having from 4 to 12 carbon atoms optionally interrupted by sulfur, phthaloyl, isophthaloyl, terephthaloyl or cyclohexane-1,4-dicarbonyl, or a diacyl derived from a dimeric acid, and a group of formula

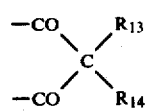

(in which $R_{13}$ represents an alkyl group having from 1 to 4 carbon atoms, benzyl group or 3,5-di-tert-butyl-4-hydroxybenzyl group and $R_{14}$ has the same meaning as above-defined $R_{13}$ or represents hydrogen atom.); or a group of formula —CONH—$R_{10}$—NHCO— in which $R_{10}$ represents an alkylene group having from 2 to 10, preferably 6 carbon atoms, e.g. ethylene, tetramethylene, hexamethylene, octamethylene or decamethylene, a phenylene group optionally substituted with methyl, e.g. o-, m- or p-phenylene, particularly 2,4-tolylene, a naphthylene group, e.g. 1,5-naphthylene, a xylylene group, e.g. p-xylylene, a cyclohexylene group optionally substituted with methyl, e.g. 1,4-cyclohexylene or methyl-2,4-cyclohexylene, a group of formula

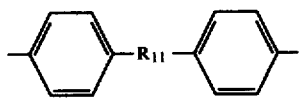

(in which $R_{11}$ represents oxygen atom or methylene group), a group of formula

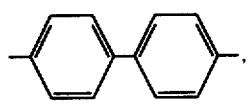

a group of formula

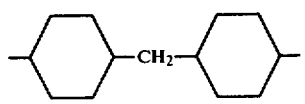

or a group of formula

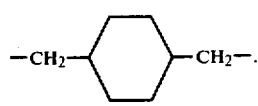

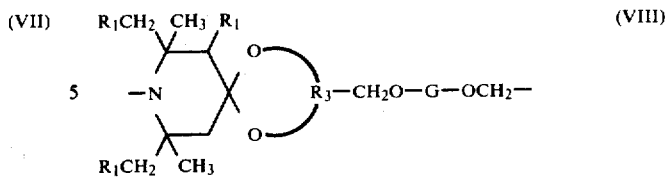
(VIII)

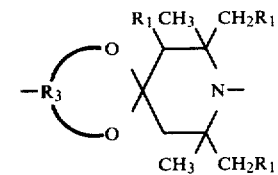

in which:

$R_1$ and $R_3$ have the meanings defined above.

G has the same meaning as above-defined D, or it represents an alkylene group having from 3 to 10, preferably 4 to 6 carbon atoms, e.g. trimethylene, tetramethylene, hexamethylene, octamethylene or decamethylene; a xylylene group, e.g. o-, m- or p-xylylene, preferably p-xylylene; a group of formula

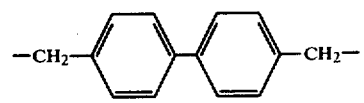

or a group of formula

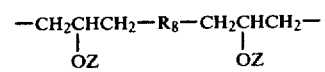

in which $R_8$ has the meaning defined above and Z has the meaning defind below.

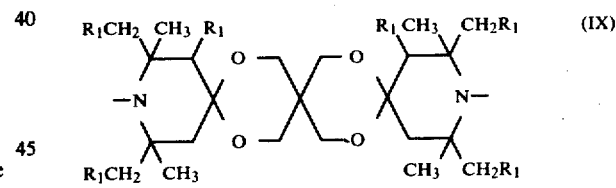
(IX)

in which: $R_1$ has the meaning defined above.

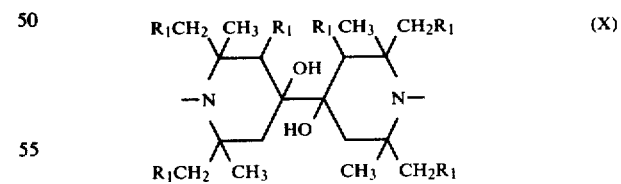
(X)

in which: $R_1$ has the meaning defined above.

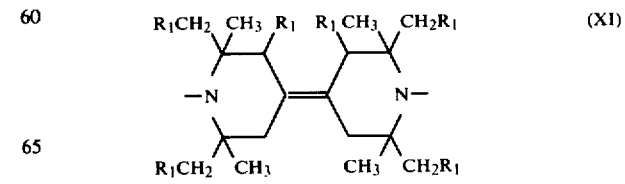
(XI)

in which: $R_1$ has the meaning defined above.

All of Z in the molecule represent hydrogen atom; an alkyl group having from 1 to 18 carbon atoms, e.g. methyl, ethyl, n-propyl, n-butyl, octyl, dodecyl or octadecyl, particularly methyl; an aliphatic, aromatic, araliphatic or alicyclic acyl group having up to 18 carbon atoms, for example as described in $R_9$, an alkanoyl having from 2 to 18, preferably 2 to 4 carbon atoms, benzoyl, toluoyl or 3-(3,5-di-tert-butyl-4-hydroxyphenyl)-propionyl; a group of formula —CONHR$_{12}$ in which $R_{12}$ is an alkyl group having from 1 to 18, preferably 1 to 4 carbon atoms, phenyl group or cyclohexyl group.

Alternatively, a part of Z in the molecule represent hydrogen atom and the remaining Z represent above-defined groups other than hydrogen atom.

Preferably, all of Z in the molecule represent hydrogen atom, acetyl group or benzoyl group, or a part of Z in the molecule are hydrogen atom and the remaining Z are acetyl group or benzoyl group.

In formula (I), the terminal groups

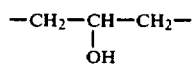

may be present as groups of formula

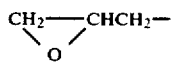

which impart similar stabilizing effect and included within the scope of polymer of the invention.

Among the polymers of formula (I), preferred groups are as follows:

(1) in formula (I), when both $m_1$ and $m_2$ represents 0;

(1-a) polymers in which Y is a group of formula (II) and $R_1$ and $R_2$ are hydrogen atoms, (1-b) polymers in which Y is a group of formula (III) or (IV) and $R_1$ is hydrogen atom:

(2) in formula (I), when one of $m_1$ and $m_2$ represents 1 and another represents 0, X represents a group of formula —OCH$_2$CH$_2$O— or —OWO— in which W represents a group of formula

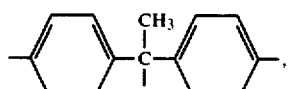

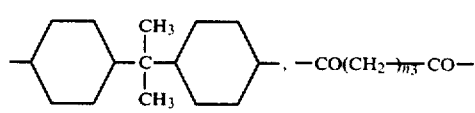

($n_3$ represents an integer of from 4 to 10, preferably 4) or a group of formula

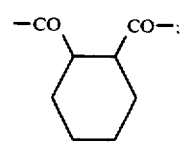

most preferably X is a group of formula

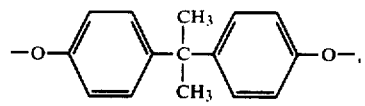

(2-a) polymers in which Y is a group of formula (V), $R_1$ and $R_2$ are hydrogen atoms and A is an alkylene group having from 2 to 6, particularly 6 carbon atoms or a group of formula

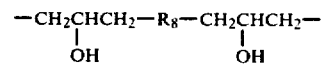

($R_8$ has the same meaning as above-defined X), (2-b) polymers in which Y is a group of formula (VI), $R_1$ is hydrogen atom, $R_9$ is an alkanoyl group having from 2 to 4 carbon atoms or an alkyl group having from 1 to 8 carbon atoms and B is an alkylene group having from 2 to 6 carbon atoms; or $R_9$ is an alkyl group having from 1 to 8 carbon atoms and B is a group of formula

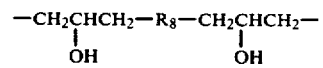

($R_8$ has the same meaning as above-defined X); a particularly, polymers in which $R_9$ is acetyl group and B is an alkylene group having from 2 to 6 carbon atoms, (2-c) polymers in which Y is a group of formula (VII), $R_1$ is hydrogen atom and D is an alkanedicarbonyl group having from 4 to 12 carbon atoms, particularly 10 carbon atoms or a group of formula

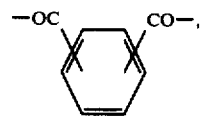

(2-d) polymers in which Y is a group of formula (VIII), $R_1$ is hydrogen atom and G is an alkanedicarbonyl group having from 4 to 12 carbon atoms or a group of formula

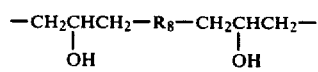

($R_8$ has the same meaning as above-defined X), (2-e) polymers in which Y is a group of formula (IX), (X) or (XI) and $R_1$ is hydrogen atom.

The following is a non-limiting list of recurring unit of the polymers of the invention:

| No. | $R_1$ | $R_2$ |
|---|---|---|
| II-1 | H | H |
| II-2 | CH$_3$ | H |

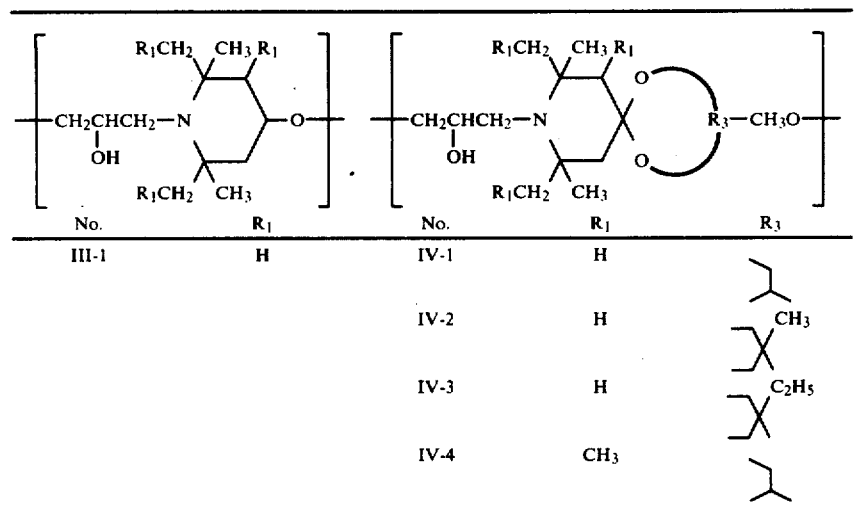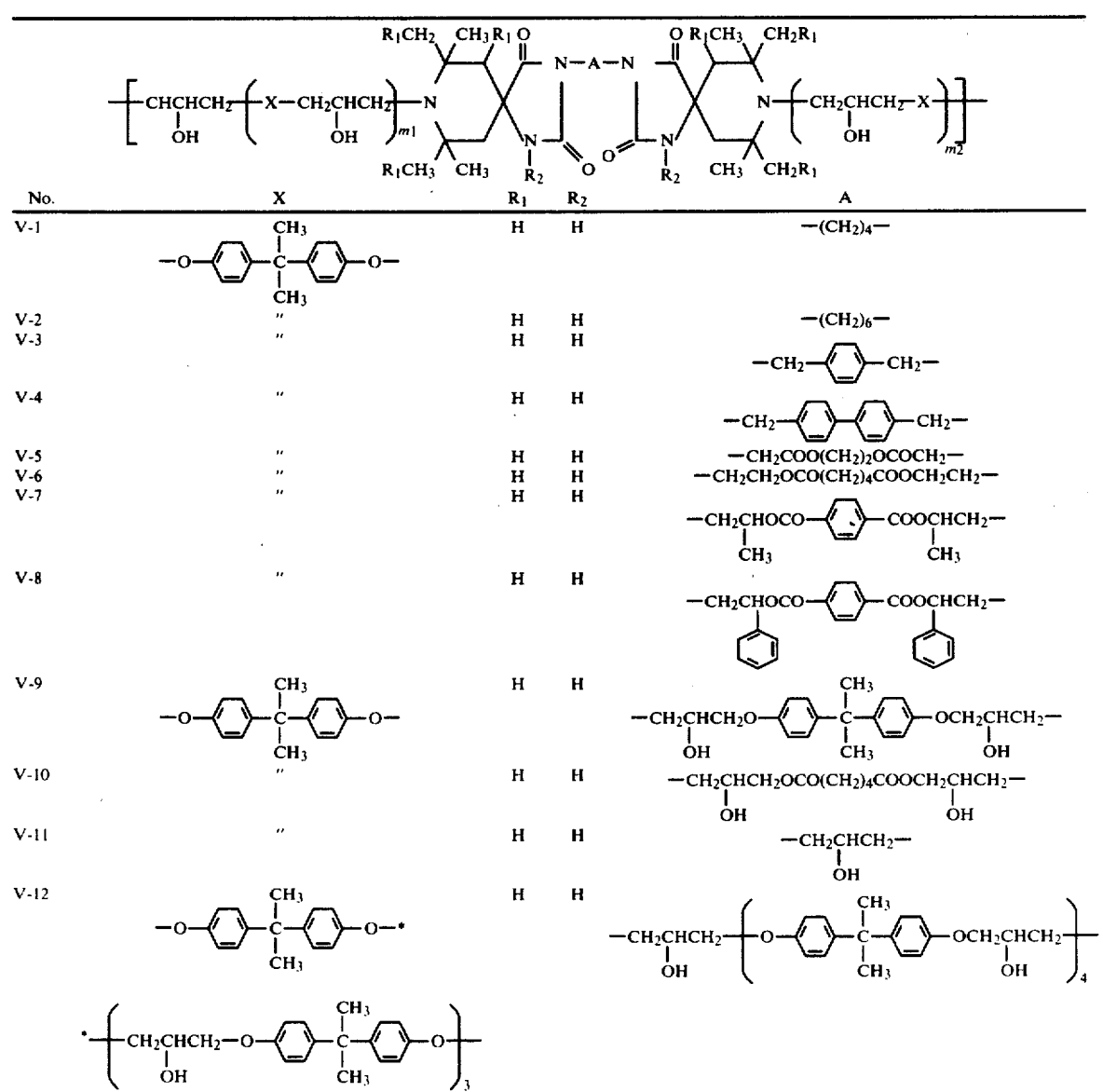

-continued

[Structure: polymer with repeating units containing $R_1CH_2$, $CH_3R_1$, O, N-A-N, piperidine rings with $R_2$, connected via X groups and CHCH$_2$-OH end groups, with indices m1, m2]

| No. | X | $R_1$ | $R_2$ | A |
|---|---|---|---|---|
| V-13 | -O-⟨cyclohexyl⟩-C(CH$_3$)$_2$-⟨cyclohexyl⟩-O- | H | H | -(CH$_2$)$_6$- |
| V-14 | " | H | H | -CH$_2$CHCH$_2$O-⟨cyclohexyl⟩-C(CH$_3$)$_2$-⟨cyclohexyl⟩-OCH$_2$CHCH$_2$- (with OH groups) |
| V-15 | -OCO(CH$_2$)$_4$COO- | H | H | -(CH$_2$)$_4$- |
| V-16 | -OCO(CH$_2$)$_4$COO- | H | H | -CH$_2$CHCH$_2$OCO(CH$_2$)$_4$COOCH$_2$CHCH$_2$- (with OH) |
| V-17 | -OCO(CH$_2$)$_8$COO- | H | H | -CH$_2$CHCH$_2$OCO(CH$_2$)$_8$COOCH$_2$CHCH$_2$- (with OH) |
| V-18 | -COO-⟨phenyl⟩-COO- | H | H | -CH$_2$CHCH$_2$OCO-⟨phenyl⟩-COOCH$_2$CHCH$_2$- (with OH) |
| V-19 | -OCO-⟨cyclohexyl⟩-COO- | H | H | -CH$_2$CHCH$_2$OCO-⟨cyclohexyl⟩-COOCH$_2$CHCH$_2$- (with OH) |
| V-20 | -OCH$_2$CH$_2$O- | H | H | -CH$_2$CHCH$_2$OCH$_2$CH$_2$OCH$_2$CHCH$_2$- (with OH) |
| V-21 | -O-(CH$_2$CHO)$_9$- with CH$_3$ | H | H | -CH$_2$CHCH$_2$O-(CH$_2$CHO)$_9$-OCH$_2$CHCH$_2$- (with OH, CH$_3$) |
| V-22 | -OCH$_2$CHCH$_2$O- (with OH) | H | H | -CH$_2$CHCH$_2$OCH$_2$CHCH$_2$OCH$_2$CHCH$_2$- (with OH) |
| V-23 | -O-⟨phenyl⟩-C(CH$_3$)$_2$-⟨phenyl⟩-O- | H | CH$_3$ | -(CH$_2$)$_4$- |
| V-24 | " | CH$_3$ | H | " |
| V-25 | -O-⟨phenyl⟩-CH$_2$-⟨phenyl⟩-O- | H | H | " |

[Structure: polymer with repeating piperidine units connected via N-B-N with $R_9$ substituents, X linking groups, and CHCH$_2$-OH end groups, with indices m1, m2]

| No. | X | $R_1$ | $R_9$ | B |
|---|---|---|---|---|
| VI-1 | -O-⟨phenyl⟩-C(CH$_3$)$_2$-⟨phenyl⟩-O- | H | COCH$_3$ | -(CH$_2$)$_2$- |
| VI-2 | " | H | " | -(CH$_2$)$_3$- |
| VI-3 | " | H | " | -(CH$_2$)$_4$- |
| VI-4 | " | H | " | -(CH$_2$)$_6$- |
| VI-5 | " | H | -COC$_2$H$_5$ | " |
| VI-6 | " | H | -COC$_{11}$H$_{23}$ | " |
| VI-7 | " | H | -COC$_{17}$H$_{35}$ | " |

-continued $$\left[-CH_2CH-\left(X-CH_2CH\right)_{m1}N\overset{R_1CH_2}{\underset{R_1CH_2}{\overset{CH_3}{\underset{CH_3}{\bigvee}}}}\overset{R_1}{\underset{}{\bigvee}}\overset{R_9}{\underset{}{N}}-B-\overset{R_9}{\underset{}{N}}\overset{R_1CH_3}{\underset{CH_3}{\overset{CH_2R_1}{\underset{CH_2R_1}{\bigvee}}}}N\left(CH_2CH-X\right)_{m2}\right]$$

| No. | X | $R_1$ | $R_9$ | B |
|---|---|---|---|---|
| VI-8 | " | H | $-CO-\phenyl$ | " |
| VI-9 | " | H | $-COCH_2CH_2-\text{(di-t-butyl-hydroxyphenyl)}$ | |
| VI-10 | " | H | $-CH_3$ | " |
| VI-11 | " | H | $-C_4H_9$ | " |
| VI-12 | " | H | $-C_8H_{17}$ | " |
| VI-13 | " | H | $-COCH_3$ | $-(CH_2)_{10}-$ |
| VI-14 | " | H | $-C_4H_9$ | $-CH_2-\phenyl-CH_2-$ |
| VI-15 | " | H | " | $-CH_2-\text{biphenyl}-CH_2-$ |
| VI-16 | " | H | " | $-CH_2COO(CH_2)_2OCOCH_2-$ |
| VI-17 | " | H | " | $-CH_2CH_2OCO(CH_2)_2COOCH_2CH_2-$ |
| VI-18 | " | H | " | $-CH_2CH_2OCO(CH_2)_8COOCH_2CH_2-$ |
| VI-19 | " | H | " | $-CH_2CH_2OCO-\phenyl-COOCH_2CH_2-$ |
| VI-20 | " | H | $-CH_3$ | $-CH_2CHOH CH_2O-\phenyl-C(CH_3)_2-\phenyl-OCH_2CHOH CH_2-$ |
| VI-21 | " | H | $-C_2H_5$ | " |
| VI-22 | " | H | $-C_4H_9$ | " |
| VI-23 | " | H | $-C_8H_{17}$ | " |
| VI-24 | " | H | $-C_{12}H_{25}$ | " |
| VI-25 | " | H | $-C_{18}H_{37}$ | " |
| VI-26 | $-O-\text{cyclohexyl}-C(CH_3)_2-\text{cyclohexyl}-O-$ | H | $-COCH_3$ | $-(CH_2)_6-$ |
| VI-27 | " | H | $-C_4H_9$ | $-CH_2CHOH CH_2O-\text{cyclohexyl}-C(CH_3)_2-\text{cyclohexyl}-OCH_2CHOH CH_2-$ |
| VI-28 | $-OCO(CH_2)_4COO-$ | H | $-COCH_3$ | $-(CH_2)_2-$ |
| VI-29 | " | H | " | $-(CH_2)_6-$ |
| VI-30 | " | H | $-C_2H_5$ | $-CH_2CHOH CH_2OCO(CH_2)_4COOCH_2CHOH CH_2-$ |
| VI-31 | " | H | $-C_4H_9$ | " |
| VI-32 | " | H | $-C_8H_{17}$ | " |
| VI-33 | $-OCO-\text{(phthaloyl)}-COO-$ | H | $-COCH_3$ | $-(CH_2)_6-$ |
| VI-34 | " | H | $-C_4H_9$ | $-CH_2CHOH CH_2OCO-\text{phenyl}-COOCH_2CHOH CH_2-$ |
| VI-35 | $-OCO-\text{(hexahydrophthaloyl)}-COO-$ | H | $-COCH_3$ | $-(CH_2)_2-$ |
| VI-36 | " | H | " | $-(CH_2)_6-$ |
| VI-37 | " | H | $-C_4H_9$ | |
| VI-38 | " | H | $-C_2H_5$ | $-CH_2CHOH CH_2OCO-\text{cyclohexyl}-COOCH_2CHOH CH_2-$ |

-continued

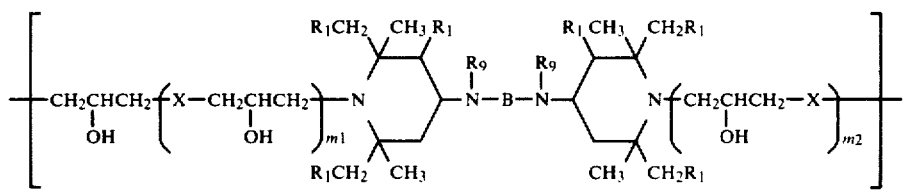

| No. | X | $R_1$ | $R_9$ | B |
|---|---|---|---|---|
| VI-39 | " | H | —$C_4H_9$ | " |
| VI-40 | " | H | —$C_8H_{17}$ | " |
| VI-41 | —$OCH_2CH_2O$— | H | —$COCH_3$ | —$(CH_2)_6$— |
| VI-42 | " | H | —$C_4H_9$ | —CH$_2$CHCH$_2$OCH$_2$CH$_2$OCH$_2$CHCH$_2$— with OH, OH |
| VI-43 | —OCH$_2$CHCH$_2$O— with OH | H | " | —CH$_2$CHCH$_2$— with OH |
| VI-44 | —O—C$_6$H$_4$—C(CH$_3$)$_2$—C$_6$H$_4$—O— | $CH_3$ | —$COCH_3$ | —$(CH_2)_6$— |
| VI-45 | —O—C$_6$H$_4$—CH$_2$—C$_6$H$_4$—O— | H | " | " |
| VI-46 | " | H | —$C_2H_5$ | —CH$_2$CHCH$_2$O—C$_6$H$_4$—CH$_2$—C$_6$H$_4$—OCH$_2$CHCH$_2$— with OH, OH |

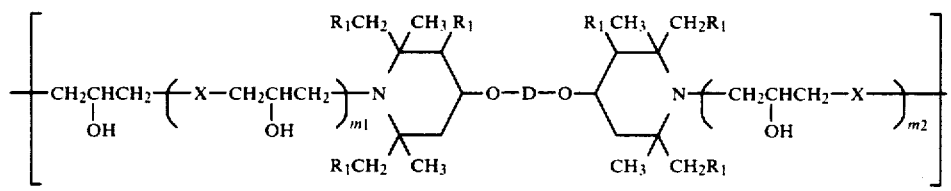

| No. | X | $R_1$ | D |
|---|---|---|---|
| VII-1 | —O—C$_6$H$_4$—C(CH$_3$)$_2$—C$_6$H$_4$—O— | H | —$CO(CH_2)_2CO$— |
| VII-2 | " | H | —$CO(CH_2)_4CO$— |
| VII-3 | " | H | —$CO(CH_2)_8CO$— |
| VII-4 | " | H | —$CO(CH_2)_{10}CO$— |
| VII-5 | " | H | —$CO(CH_2)_2$—S—$(CH_2)_2CO$— |
| VII-6 | " | H | —CO—(o-C$_6$H$_4$)—CO— |
| VII-7 | " | H | —CO—(cyclohexyl)—CO— |
| VII-8 | " | H | —CO—C(—CO—)(—CH$_2$—C$_6$H$_5$)$_2$ |
| VII-9 | " | H | —CO—C(—CO—)(—CH—)—C$_6$H$_2$(t-Bu)$_2$OH |
| VII-10 | " | H | —CO—C(—CO—)(—CH$_2$—C$_6$H$_2$(t-Bu)(OH)$_2$)$_2$ |

-continued $$\left[-CH_2CHCH_2-\left(X-CH_2CHCH_2\right)_{m1}-N\underset{R_1CH_2\ CH_3}{\overset{R_1CH_2\ CH_3\ R_1}{\diagdown}}\underset{CH_3\ CH_2R_1}{\overset{R_1\ CH_3\ CH_2R_1}{\diagdown}}N-\left(CH_2CHCH_2-X\right)_{m2}\right]$$

| No. | X | $R_1$ | D |
|---|---|---|---|
| VII-11 | " | H | $-CO-C(C_4H_9)(-CO-)-CH_2-C_6H_2(CH_3)_2-OH$ |
| VII-12 | " | H | $-COC_{34}H_{62}CO-$ |
| VII-13 | " | H | $-CONH-(CH_2)_6-NHCO-$ |
| VII-14 | " | H | $-CONH-C_6H_3(CH_3)-NHCO-$ |
| VII-15 | " | H | $-CONH-\text{naphthyl}-NHCO-$ |
| VII-16 | " | H | $-CONHCH_2-C_6H_4-CH_2NHCO-$ |
| VII-17 | " | H | $-CONH-C_6H_9(CH_3)-NHCO-$ |
| VII-18 | " | H | $-CONH-C_6H_4-O-C_6H_4-NHCO-$ |
| VII-19 | " | H | $-CONH-C_6H_4-CH_2-C_6H_4-NHCO-$ |
| VII-20 | " | H | $-CONH-C_6H_4-C_6H_4-NHCO-$ |
| VII-21 | " | H | $-CONH-C_6H_{10}-CH_2-C_6H_{10}-NHCO-$ |
| VII-22 | $-O-C_6H_4-CH_2-C_6H_4-O-$ | H | $-CONHCH_2-C_6H_{10}-CH_2NHCO-$ |
| VII-23 | $-O-C_6H_{10}-C(CH_3)_2-C_6H_{10}-O-$ | H | $-CO(CH_2)_8CO-$ |
| VII-24 | $-OCO(CH_2)_4COO-$ | H | $-CO(CH_2)_4CO-$ |
| VII-25 | " | H | $-CO(CH_2)_8CO-$ |
| VII-26 | $-OCO(CH_2)_8CO-$ | H | " |
| VII-27 | $-OCO(CH_2)_{10}COO-$ | H | " |
| VII-28 | $-OCO-C_6H_4-COO-$ (ortho) | H | " |
| VII-29 | $-OCO-C_6H_{10}-COO-$ | H | " |
| VII-30 | $-OCH_2CH_2O-$ | H | " |
| VII-31 | $-OCH_2CH(OH)CH_2O-$ | H | " |
| VII-32 | $-O-C_6H_4-C(CH_3)_2-C_6H_4-O-$ | $CH_3$ | " |

-continued
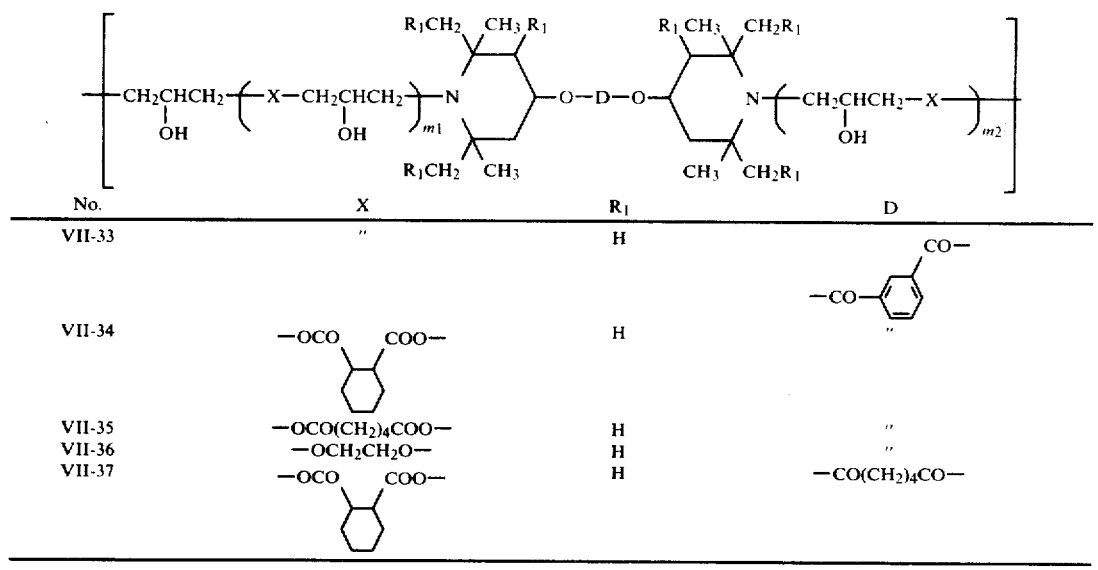
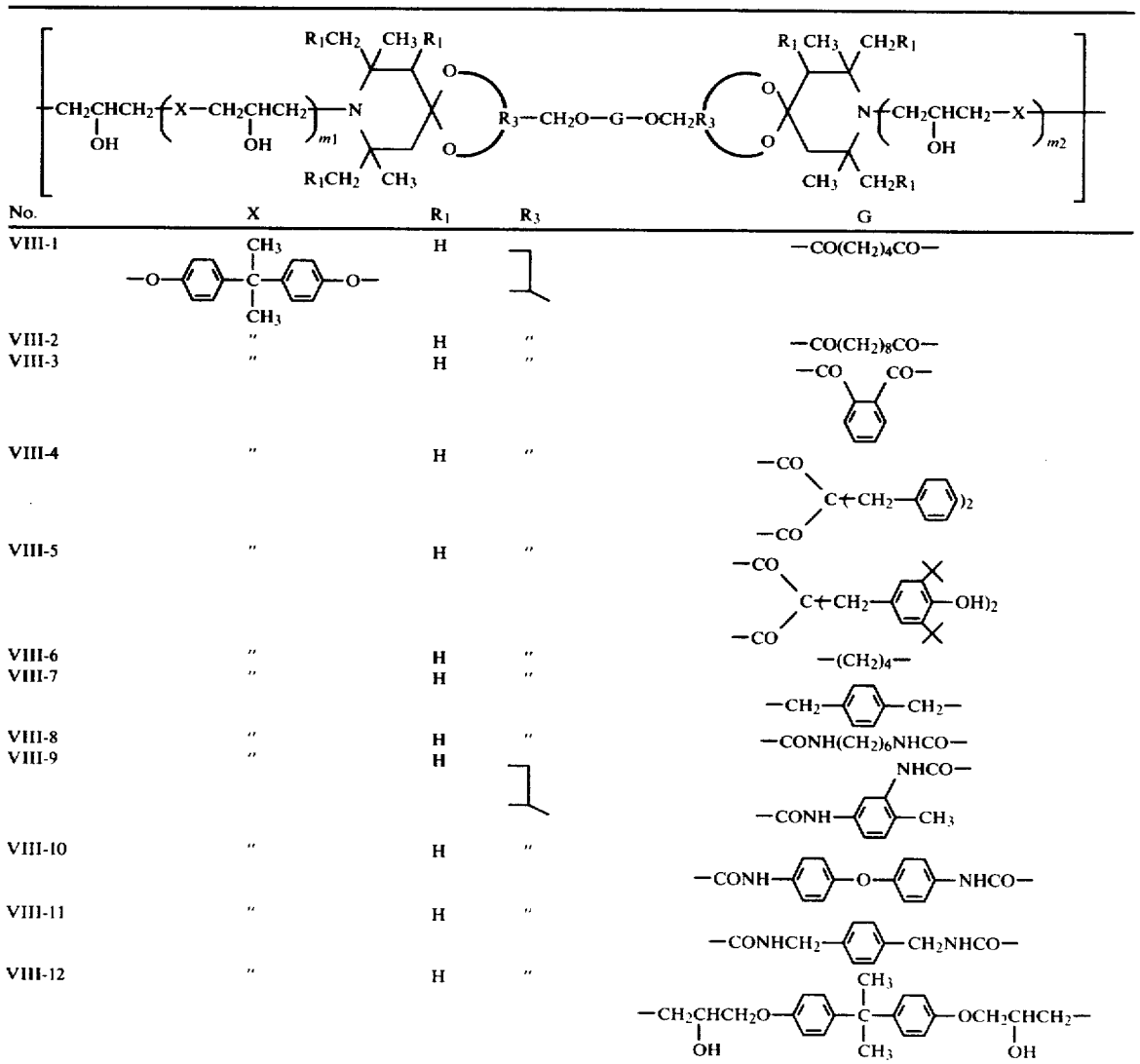

-continued

| No. | X | $R_1$ | $R_3$ | G |
|---|---|---|---|---|
| VIII-13 | " | H | —C(CH$_3$)$_3$ | —CO(CH$_2$)$_4$CO— |
| VIII-14 | " | H | " | —CO(CH$_2$)$_2$—S—(CH$_2$)$_2$CO— |
| VIII-15 | " | H | " | —CO-(cyclohexane-1,2-diyl)-CO— |
| VIII-16 | " | H | " | —CO—C$_{34}$H$_{62}$—CO— |
| VIII-17 | " | H | " | —CH$_2$—(biphenyl)—CH$_2$— |
| VIII-18 | " | H | " | —CONH—(naphthalene-1,5-diyl)—NHCO— |
| VIII-19 | " | H | " | —CONHCH$_2$—(cyclohexyl)—CH$_2$—NHCO— |
| VIII-20 | " | H | " | —CONH—(methylcyclohexyl)—NHCO— |
| VIII-21 | —O—C$_6$H$_4$—C(CH$_3$)$_2$—C$_6$H$_4$—O— | H | —C(CH$_3$)$_2$C$_2$H$_5$ | —CO(CH$_2$)$_4$CO— |
| VIII-22 | " | H | " | —CO(CH$_2$)$_{10}$CO— |
| VIII-23 | " | H | " | —CO—C$_6$H$_4$—CO— |
| VIII-24 | " | H | " | —CO—C(C$_4$H$_9$)(CH$_2$-C$_6$H$_3$(OH)(C(CH$_3$)$_3$)$_2$)—CO— |
| VIII-25 | " | H | " | —(CH$_2$)$_6$— |
| VIII-26 | " | H | " | —CONH—C$_6$H$_4$—CH$_2$—C$_6$H$_4$—NHCO— |
| VIII-27 | " | H | " | —CONH—C$_6$H$_4$—C$_6$H$_4$—NHCO— |
| VIII-28 | " | H | " | —CH$_2$CHCH$_2$O—C$_6$H$_4$—C(CH$_3$)$_2$—C$_6$H$_4$—OCH$_2$CHCH$_2$— (with OH), —CO(CH$_2$)$_4$CO— |
| VIII-29 | —O—C$_6$H$_4$—CH$_2$—C$_6$H$_4$—O— | H | —CH(CH$_3$)$_2$ | —CO(CH$_2$)$_4$CO— |
| VIII-30 | —O—C$_6$H$_{10}$—C(CH$_3$)$_2$—C$_6$H$_{10}$—O— | H | —CH(CH$_3$)$_2$ | |
| VIII-31 | " | H | —C(CH$_3$)$_2$C$_2$H$_5$ | —CH$_2$CHCH$_2$O—C$_6$H$_{10}$—C(CH$_3$)$_2$—C$_6$H$_{10}$—OCH$_2$CHCH$_2$— (with OH), —CO(CH$_2$)$_4$CO— |
| VIII-32 | —OCO(CH$_2$)$_4$COO— | H | —CH(CH$_3$)$_2$ | —CO(CH$_2$)$_4$CO— |

-continued $$\left[-CH_2CH(OH)CH_2-(X-CH_2CH(OH)CH_2)_{m1}-N\underset{R_1CH_2\ CH_3}{\overset{R_1CH_2\ CH_3\ R_1}{\diagup}}\underset{O}{\overset{O}{\diagdown}}\ R_3-CH_2O-G-OCH_2R_3\ \underset{CH_3\ CH_2R_1}{\overset{R_1\ CH_3\ CH_2R_1}{\diagup}}\underset{O}{\overset{O}{\diagdown}}N-(CH_2CH(OH)CH_2-X)_{m2}-\right]$$

| No. | X | $R_1$ | $R_3$ | G |
|---|---|---|---|---|
| VIII-33 | " | H | " | $-CH_2CH(OH)CH_2O-\phi-C(CH_3)_2-\phi-OCH_2CH(OH)CH_2-$ |
| VIII-34 | $-OCO-\text{(cyclohexyl)}-COO-$ | H | " | $-CO(CH_2)_4CO-$ |
| VIII-35 | " | H | " | $-CH_2CH(OH)CH_2OCO-\text{(cyclohexyl)}-COOCH_2CH(OH)CH_2-$ |
| VIII-36 | $-OCH_2CH_2O-$ | H | " | $-CH_2CH(OH)CH_2OCH_2CH_2OCH_2CH(OH)CH_2-$ |
| VIII-37 | $-O-\phi-C(CH_3)_2-\phi-O-$ | $CH_3$ | " | $-CO(CH_2)_4CO-$ |

$$\left[-CH_2CH(OH)CH_2-(X-CH_2CH(OH)CH_2)_{m1}-N\underset{R_1CH_2\ CH_3}{\overset{R_1CH_2\ CH_3\ R_1}{\diagup}}\underset{O}{\overset{O}{\diagdown}}C\underset{O}{\overset{O}{\diagdown}}\underset{CH_3\ CH_2R_1}{\overset{R_1\ CH_3\ CH_2R_1}{\diagup}}N-(CH_2CH(OH)CH_2-X)_{m2}-\right]$$

| No. | X | $R_1$ |
|---|---|---|
| IX-1 | $-O-\phi-C(CH_3)_2-\phi-O-$ | H |
| IX-2 | $-O-\text{cyclohexyl}-C(CH_3)_2-\text{cyclohexyl}-O-$ | H |
| IX-3 | $-O-\phi-CH_2-\phi-O-$ | H |
| IX-4 | $-OCO(CH_2)_8COO-$ | H |
| IX-5 | $-OCO-\text{(cyclohexyl)}-COO-$ | H |
| IX-6 | $-OCH_2CH_2O-$ | H |
| IX-7 | $-O-\phi-C(CH_3)_2-\phi-O-$ | $CH_3$ |

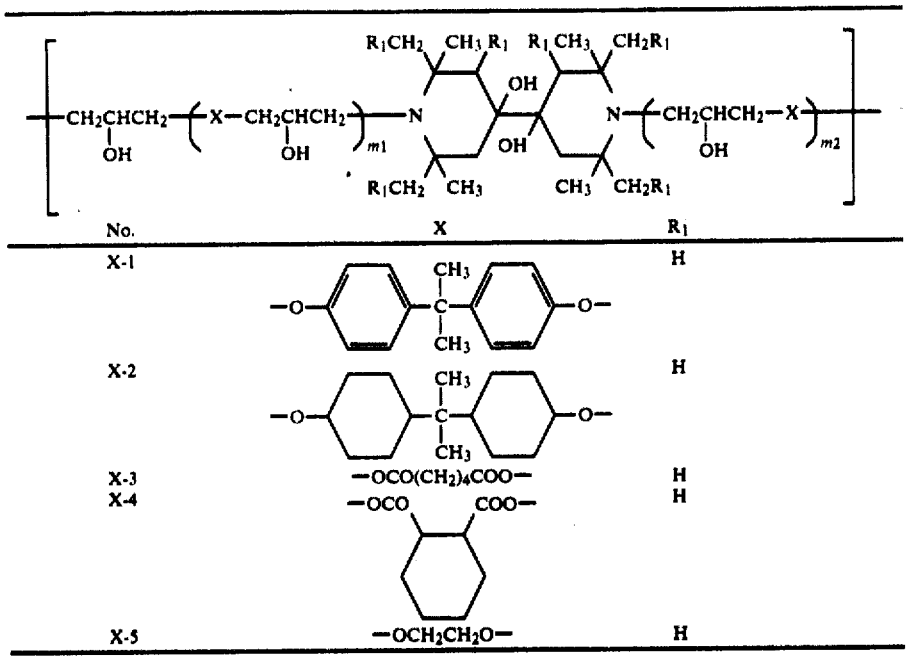

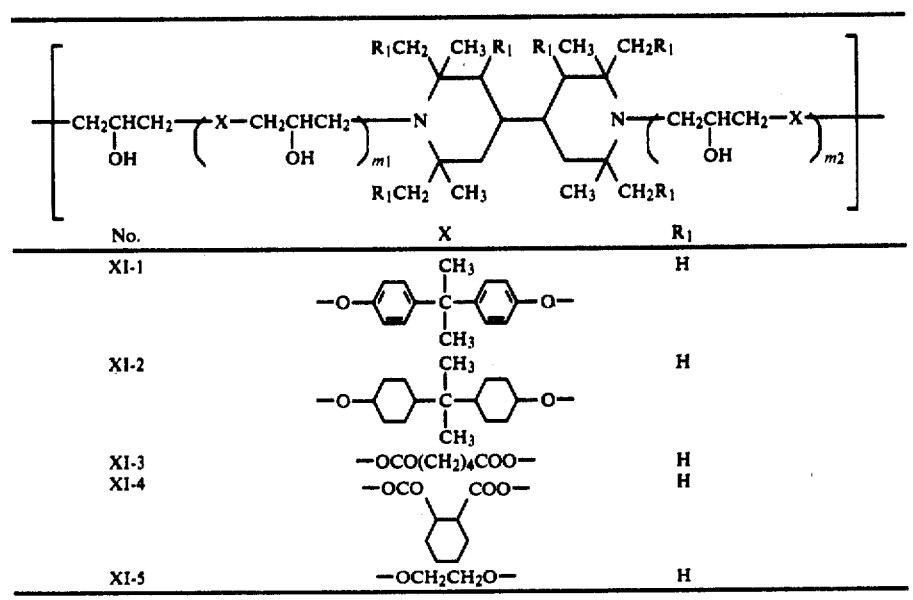

The polymers of the invention having formula (I) may be either homopolymer or copolymer. In other words, each of the meanings W, X and Y may be all same, partly different, or all different in their structures. In some instances, copolymers give better physical and-/or stabilizing properties than homopolymers.

Derived polymers having the above-mentioned recurring unit and a part or all of hydroxy groups of the polymer are etherified, esterified or derived into carbamate are also representative polymers of the invention.

As such derived polymers are preferably mentioned, e.g. methyl ethers, ethyl ethers, acetates, propionates, benzoates, N-methyl carbamates, N-ethyl carbamates, N-phenyl carbamates and N-cyclohexyl carbamates.

The polymers of formula (I) according to the invention may be prepared by any one of following methods which are performed under per se known conditions.

(1) Polymers in which Z is hydrogen atom and both $m_1$ and $m_2$ are O may be prepared by polymerizing an epoxy compound having the formula

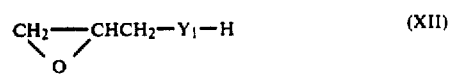

(in which, $Y_1$ is a group of formulae (II) to (IV), with proviso that 2,3-epoxypropyl group is linked to the nitrogen atom at 3-position, the oxygen atom at 4-position or the oxygen atom of —CH$_2$O— in formulae (II), (III) and (IV), respectively.

The reaction is performed preferably by heating the starting compound (XII) at 60°–230° C. in the presence or absence of an inert solvent. As the solvent, there may be employed, e.g. ethers such as dioxane or diethyleneglycol dimethyl ether; dialkylamides such as dimethylformamide or dimethylacetamide; chlorinated or non-chlorinated aromatic hydrocarbons such as benzene, toluene, xylene, chlorobenzene or p-dichlorobenzene; and alcohols or mixtures thereof with water such as methanol, ethanol, n- ot tert-butanol, n-octanol, aqueous methanol or aqueous ethanol.

In performing the reaction, there may be employed a catalyst, if necessary. As the catalyst are mentioned known ones used for hardening of epoxy resins, e.g. tert-amines such as triethylamine, triethanolamine or 1,5-diazabicyclo[5.4.0]-undecene-5 (DBU) or Lewis acids such as boron trifluoride or zinc borofluoride.

The starting compounds (XII) may be prepared by reacting a compound of formula H-$Y_1$-H with 1 mole equivalent of an epihalohydrin.

(2) Polymers of formula (I) in which Z is hydrogen atom and one of $m_1$ and $m_2$ is 1 and another is 0 may be prepared by polymerizing an epoxy compound of formula

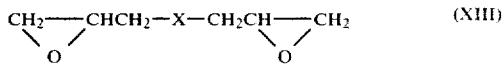

with a piperidine compound of formula H-$Y_2$-H, or by polymerizing an epoxy compound containing piperidine of formula

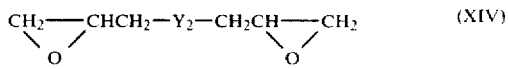

with a compound H-X-H (in which, $Y_2$ is above-defined group of formula (V) to (XI) and X has the meaning defined above.).

The reaction is performed in the similar conditions as in the above-mentioned (1).

The starting compounds (XIV) may be prepared by reacting a compound of formula H-$Y_2$-H with 2 mole equivalent of an epihalohydrin.

(3) Compounds of formula (I) in which a part or all of hydrogen atom of Z are substituted may be prepared by introducing a substituent to a compound in which Z is hydrogen atom and obtained in accordance with the above-mentioned (1) or (2), by the methods described below:

(3-a) Compounds in which Z is an alkyl group may be prepared by reacting the corresponding compound in which Z is hydrogen atom with a strong basic alkali metal compound such as sodium hydride or potassium tert-butyrate and then with the desired alkyl halide.

(3-b) Compounds in which Z is an acyl group may be prepared by reacting the corresponding compound in which Z is hydrogen atom with a reactive derivative of the corresponding carboxylic acid. As the reactive derivatives, are employed acid halides, acid lower alkyl esters or acid anhydrides, preferably acid anhydrides.

(3-c) Compounds in which Z is a N-substituted carbamoyl group may be prepared by reacting the corresponding compound in which Z is hydrogen atom with the corresponding isocyanate.

The polymers of formula (I) according to the invention can effectively stabilize wide varieties of synthetic polymers.

Synthetic polymers stabilized in this way include:

olefin and diene polymers including homopolymers of olefins and dienes (e.g. low-density, high-density and cross-linked polyethylenes, polypropylene, polyisobutylene, polymethylbutene-1, polymethylpentene-1, polyisoprene, and polybutadiene), mixtures of such homopolymers (e.g. mixtures of polypropylene and polyethylene, polypropylene and polybutene-1, or polypropylene and polyisobutylene), and copolymers of olefins and dienes (e.g. ethylene/propylene copolymers, propylene/butene-1 copolymers, propylene/isobutylene copolymers, ethylene/butene-1 copolymers, and terpolymers of ethylene and propylene with dienes such as hexadiene, dicyclopentadiene or ethylidene norbornene);

styrene polymers including polystyrene, copolymers of styrene and of α-methylstyrene (e.g. styrene/butadiene copolymers, styrene/acrylonitrile copolymers, styrene/acrylonitrile/methylmethacrylate copolymers, styrene/acrylonitrile/acrylic ester copolymers, styrene/acrylonitrile copolymers modified with acrylic ester polymers to provide impact strength, and styrene polymers modified with ethylene/propylene/diene elastomers to provide impact strength), and graft copolymers of styrene (e.g. polymers in which styrene is grafted onto polybutadiene, and polymers in which styrene and acrylonitrile are grafted onto polybutadiene as well as mixtures thereof with the aforementioned styrene copolymers commonly known as acrylonitrile/butadiene/styrene or ABS plastics);

halogenated vinyl and vinylidene polymers including polyvinyl chloride, polyvinylidene chloride, polyvinyl fluoride, polychloroprene, chlorinated rubbers, vinyl chloride/vinylidene chloride copolymers, vinyl chloride/vinyl acetate copolymers, and vinylidene chloride/vinyl acetate copolymers.

polymers derived from α,β-unsaturated acids and derivatives thereof, including polyacrylates and polymethacrylates, polyacrylic amides and polyacrylonitrile;

polymers derived from unsaturated alcohols and amines and from the acyl derivatives thereof or acetals, including polyvinyl alcohol, polyvinyl acetate, polyvinyl stearate, polyvinyl benzoate, polyvinyl maleate, polyvinyl butyral, polyallyl phthalate, and polyallyl malamine, and copolymers thereof with other ethylenically unsaturated monomers (e.g. ethylene/vinyl acetate copolymers);

epoxy polymers including homopolymers and copolymers derived from epoxides (e.g. polyethylene oxide), and polymers derived from bis-glycidyl ethers;

polyacetals, polyalkylene oxides and polyphenylene oxides including polyoxymethylene, oxymethylene/ethylene oxide copolymers, polyoxyethylene, polypropylene oxide, polyisobutylene oxide and polyphenylene oxides;

polyurethanes and polyureas;

polycarbonates;

polysulphones;

polyamides and copolyamides derived from diamines and dicarboxylic acids and/or from aminocarboxylic acids or the corresponding lactams, including nylon-6, nylon-6,6, nylon-6,10, nylon-11 and nylon-12;

polyesters derived from dicarboxylic acids and dialcohols and/or from hydroxycarboxylic acids and the corresponding lactones, e.g. polyethylene glycol terephthalate and poly-1,4-dimethylol-cyclohexane terephthalate;

cross-linked polymers derived from aldehydes together with phenols, ureas or melamines, e.g. phenol/formaldehyde, urea/formaldehyde and melamine/formaldehyde resins;

alkyd resins e.g. glycerol/phthalic acid resins and mixtures thereof with malamine/formaldehyde resins;

unsaturated polyester resins derived from copolyesters of saturated and unsaturated dicarboxylic acids with polyhydric alcohols as well as from vinyl compounds as cross-linking agents, and also halogenated flame-resistant modifications thereof.

The amount of the stabilizers of the invention needed for effective stabilization of organic polymers will depend on a variety of factors, such as the type and properties of the polymer concerned, its intended use, and the presence of other stabilizers. It is generally satisfactory to use from 0.01% to 5% by weight of the stabilizers of the invention, based on the weight of the polymer, but the most effective range will vary with the type of polymer: viz. 0.01% to 2.0%, preferably 0.02% to 1.0%, by weight for olefin, diene and styrene polymers; 0.01% to 1.0%, preferably 0.02% to 0.5%, by weight for vinyl and vinylidene polymers; and 0.01% to 5.0%, preferably 0.02% to 2.0%, by weight for polyurethanes and polyamides. If desired, two or more of the stabilizers of the invention may be used together.

The polymeric stabilizers of the invention may readily be incorporated into synthetic polymers to be stabilized by conventional techniques at any convenient stage prior to the manufacture of shaped articles therefrom. For examples, the polymeric stabilizer may be mixed with the polymer to be stabilized in dry powder form, or a suspension or emulsion of the stabilizer may be mixed with a solution, suspension or emulsion of the polymer to be stabilized.

The stabilized polymeric composition of the invention may optionally also contain one or more of various additives conventionally used in polymer technology, such as the additives listed in British Patent Specification No. 1 401 924, at pages 11-13.

The invention is further illustrated by the following Examples, in which the mean molecular weight was measured by vapor pressure depression method.

EXAMPLE 1

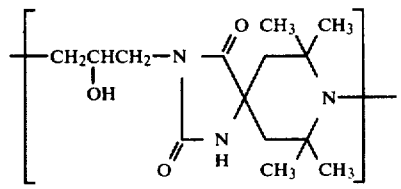

1.4 g of 3-(2,3-epoxypropyl)-7,7,9,9-tetramethyl-1,3,8-triazaspiro[4.5]decane-2,4-dione were heated at 180°-190° C. for 20 minutes in the absence of a solvent.

Ethyl acetate was added to the reaction mixture and insoluble materials were filtered off. Precipitate formed by addition of n-hexane to the ethyl acetate solution was collected by filtration and dried under reduced pressure, giving white powder (Compound No. 1) softening at 205°-208° C. and having a means molecular weight of 1,350.

EXAMPLE 2

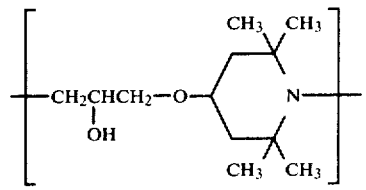

3.0 g of 4-(2,3-epoxypropoxy)-2,2,6,6-tetramethyl-piperidine were heated at 210°-220° C. for 5 hours under argon stream. Upon cooling, the reaction product solidified, giving a vitreous solid, which was triturated yielding pale yellow powder (Compound No. 2) softening at 140°-145° C. and having a mean molecular weight of 3,800.

EXAMPLE 3

Acetate of Compound No. 2

A mixture of 1.0 g of the pale yellow powder obtained in Example 2 and 10 g of acetic anhydride was heated at 100°-110° C. for 5 hours under nitrogen stream. The reaction mixture was poured into ice-water, neutralized with aqueous ammonia and extracted with ethyl acetate. The organic phase was washed with water and dried over anhydrous magnesium sulfate.

The ethyl acetate was removed by evaporation under reduced pressure, affording the desired compound (Compound No. 3) softening at 103°-106° C. The results of measurements of the compound by infrared and NMR spectrometries revealed that all of the hydroxy groups of the compound were acetylated.

EXAMPLE 4

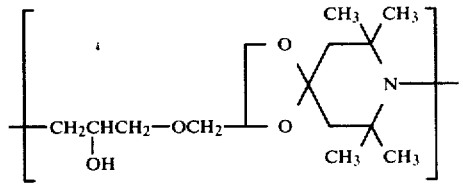

3.0 g of 2-(2,3-epoxypropoxymethyl)-7,7,9,9-tetramethyl-1,4-dioxa-8-azaspiro[4.5]decane were heated in the similar manner as in Example 2. By treating the reaction mixture, there was obtained the desired compound No. 4as pale yellow powder softening at 128°-135° C. and having a mean molecular weight of 14,000. The above-mentioned starting material was heated at 210°-220° C. for 2 hours under argon stream and treated, giving pale yellow powder (Compound No. 5) softening at 80°-85° C. and having a mean molecular weight of 2,200.

EXAMPLE 5

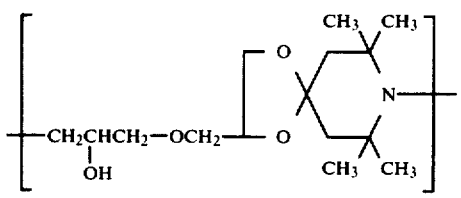

To 6.0 g of 2-hydroxymethyl-8-(2,3-epoxypropyl)-7,7,9,9-tetramethyl-1,4-dioxa-8-azaspiro[4.5]decane were added 20 ml of 10% potassium hydroxide aqueous solution and the mixture was refluxed for 5 hours, under stirring.

The reaction mixture was extracted with benzene and the benzene solution was washed with water and dried over potassium carbonate. The residue obtained by removing the solvent was purified by column chromatography (silica gel; ethyl acetate: triethylamine = 19:1), giving the desired compound (Compound No. 6) as pale yellow, viscous oily product having a mean molecular weight of 600.

EXAMPLE 6

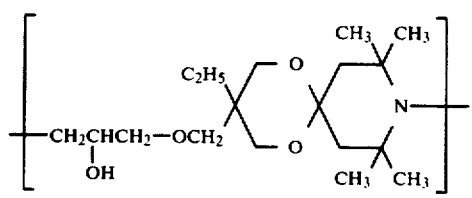

5.0 g of 3-ethyl-3-(2,3-epoxypropoxymethyl)-8,8,10,10-tetramethyl-1,5-dioxa-9-azaspiro[5.5]undecane were heated at 220°-230° C. for 10 hours under argon stream.

The reaction mixture was treated in the similar manner as in Example 2, giving the desired compound (Compound No. 7) as pale yellow powder softening at 130°-140° C. and having a mean molecular weight of 14,000.

The above-mentioned starting compound was heated at 210°-220° C. for 2 hours under argon stream and treated in the similar manner, giving the desired compound (Compound No. 8) as white powder softening at 55°-60° C. and having a means molecular weight of 1,200.

EXAMPLE 7

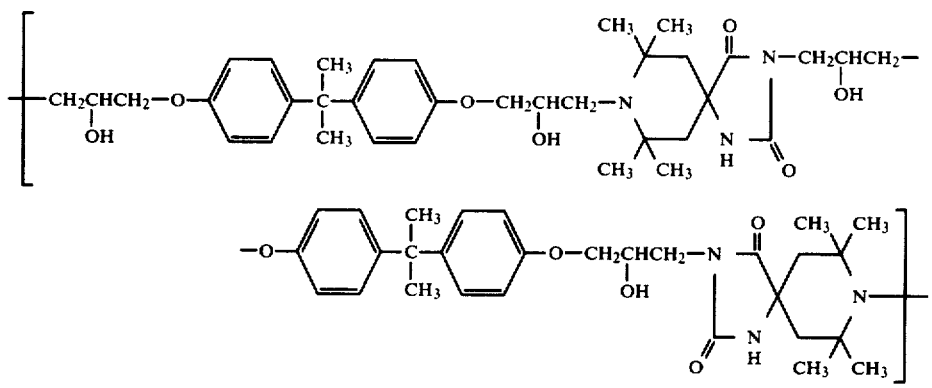

7.9 g of 2,2-bis{p-[2-hydroxy-3-(7,7,9,9,-tetramethyl-2,4-dioxo-1,3,8-triazaspiro[4.5]dec-3-yl)propoxy]-phenyl}propane and 3.4 g of 2,2-bis [p-(2,3-epoxypropoxy)-phenyl]propane were heated at 180°-190° C. for 20 minutes in the absence of solvent. The reaction mixture was washed with ethyl acetate and dried under reduced pressure, giving the desired compound (Compound No. 9) as white powder softening at 175°-180° C. and having a mean molecular weight of 3,200.

EXAMPLE 8

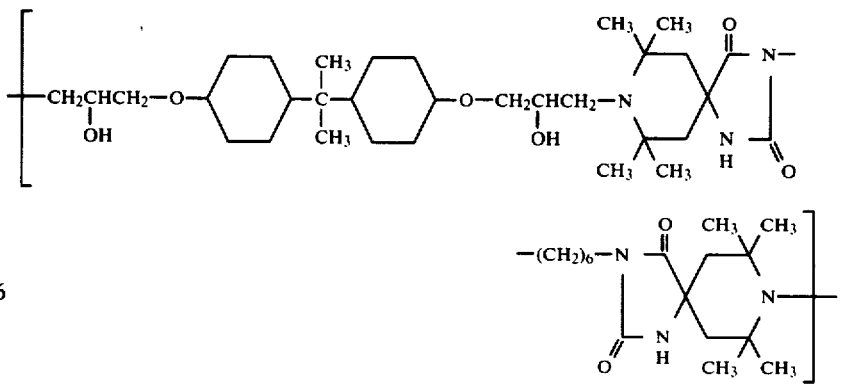

5.0 g of 3,3'-hexamethylenebis(7,7,9,9,-tetramethyl-1,3,8-triazaspiro[4.5]decane-2,4-dione) and 3.3 g of 2,2-bis [4-(2,3-epoxypropoxy)cyclohexyl]propane were heated at 230° C. for 3 hours under argon stream. The reaction mixture was dissolved in chloroform and the solution was poured into n-hexane, separating out a precipitate. The precipitate was collected by filtration and dried under reduced pressure, giving the desired compound (Compound No. 10) as white powder softening at 139°-141° C. and having a mean molecular weight of 1,900.

EXAMPLE 9

Benzoate of Compound No. 10

2.0 g of white powder obtained in Example 8 and 8.0

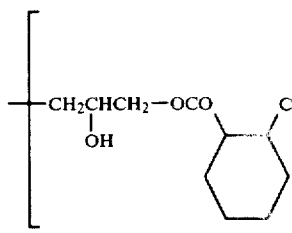
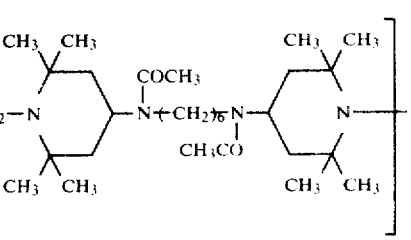

g of benzoic anhydride were heated at 150° C. for 15 hours under argon stream. The reaction mixture was dissolved in ethyl acetate, washed with 5% potassium carbonate aqueous solution and water, and dried over sodium sulfate. The residue obtained by removing the solvent was purified by column chromatography. At first, elution with ethyl acetate gave white powder (Compound No. 11) softening at 115°-120° C. The NMR spectrum of the compound showed that the benzoylation rate was 95%. Second elution with ethyl acetate: ethanol: triethylamine = 20: 1: 1 gave greyish white powder (Compound No. 12) softening at 115°-118° C.

The NMR spectrum of the compound showed that the benzoylation rate was 45%.

EXAMPLE 10

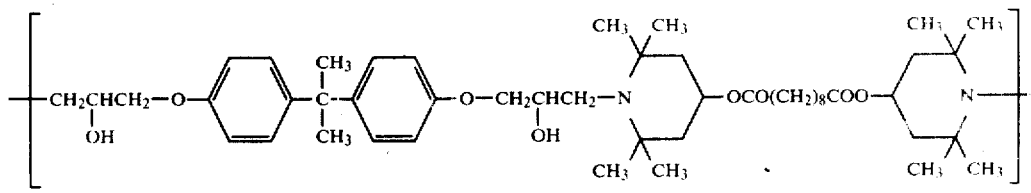

4.8 g of N,N'-hexamethylenebis[N-(2,2,6,6-tetramethyl-4-piperidyl)acetamide] and 3.4 g of 2,2-bis[p-(2,3-epoxypropoxy)phenyl]propane in 25 ml of n-octanol were refluxed at 180°-200° C. for 8 hours. n-Octanol was removed under reduced pressure and the residue was purified by column chromatography (silica gel; ethyl acetate: triethylamine: methanol = 8: 1: 1), giving white powder (Compound No. 13) softening at 108°-115° C. and having a mean molecular weight of 2,600 from the first eluate, and white powder (Compound No. 14) softening at 90°-110° C. and having a mean molecular weight of 1,650 from the second eluate.

The above-mentioned starting compound was heated at 200°-220° C. for 3 hours in the absence of a solvent and treated and purified in the similar manner, giving white powder (Compound No. 15) softening at 150°-160° C. and having a mean molecular weight of 6,000 from the first eluate, and white powder (Compound No. 16) softening at 120°-130° C. and having a mean molecular weight of 2,650 from the second eluate

EXAMPLE 11

4.8 g of N,N'-hexamethylenebis[N-(2,2,6,6-tetramethyl-4-piperidyl)acetamide] and 2.8 g of bis(2,3-epoxypropyl) 1,2-cyclohexanedicarboxylate were heated at 200° C. for 5 hours under nitrogen stream. The reaction mixture was purified by column chromatography (silica gel; ethyl acetate: triethylamine: methanol = 8: 1: 1) and the crude product thus obtained was dissolved in benzene. The benzene solution was poured into n-hexane and the precipitate formed was collected by filtration, giving white powder (Compound No. 17) softening at 115°-125° C. and having a mean molecular weight of 2,700.

EXAMPLE 12

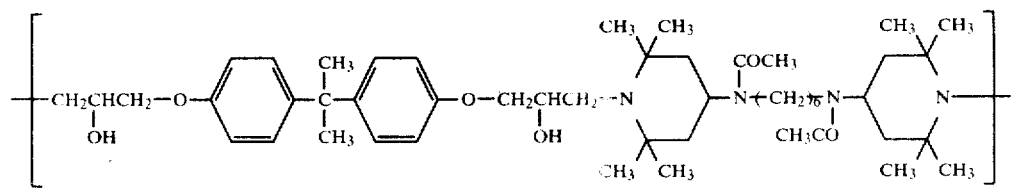

3.0 g of bis(2,2,6,6-tetramethyl-4-piperidyl) sebacate and 2.1 g of 2,2-bis[p(2,3-epoxypropoxy)phenyl]propane were heated at 190°-200° C. for 4 hours under argon stream.

The reaction mixture was purified by column chromatography (silica gel; ethyl acetate: triethylamine = 20: 1), giving pale yellow solid product (Compound No. 18) softening at 85°-90° C. and having a mean molecular weight of 2,500 from the first eluate, and pale yellow solid product (Compound No. 19) softening at 74°-77°

C. and having a mean molecular weight of 1,900 from the second eluate.

EXAMPLE 13

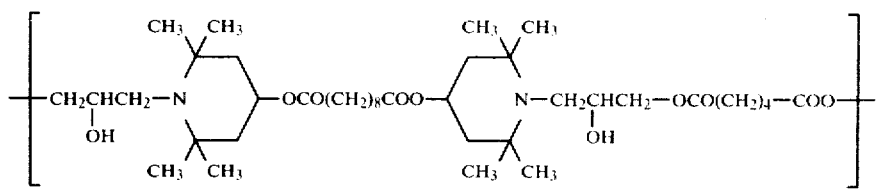

2.2 g of bis[1-(2,3-epoxypropyl)-2,2,6,6-tetramethyl-4-piperidyl] sebacate and 0.55 g of adipic acid were refluxed in 5 ml of n-butanol for 24 hours. The n-butanol was removed from the reaction mixture and the residue was washed with n-hexane and then treated with ethyl acetate.

The ethyl acetate soluble fraction was purified by column chromatography (silica gel; ethyl acetate: ethanol = 4: 1), giving the desired compound (Compound No. 20) as pale yellow oil having a mean molecular weight of 1,600.

EXAMPLE 14

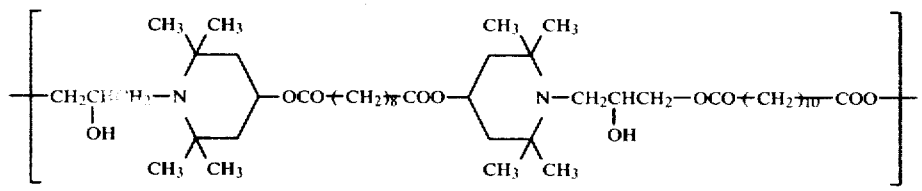

2.7 g of bis[1-(2,3-epoxypropyl)-2,2,6,6-tetramethyl-4-piperidyl] sebacate and 0.95 g of 1,10-decanedicarboxylic acid were refluxed in 6 ml of n-amyl alcohol for 17 hours. The reaction mixture was treated in the similar manner as in Example 12, giving the desired compound (Compound No. 21) as pale yellow oil having a mean molecular weight of 1,820.

EXAMPLE 15

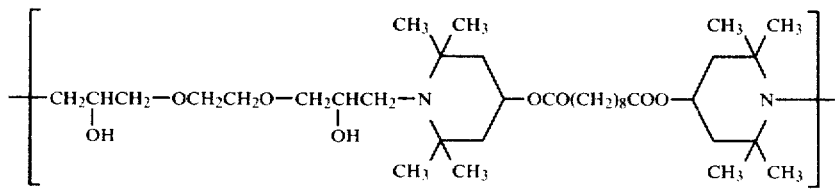

3.0 g of bis(2,2,6,6-tetramethyl-4-piperidyl) sebacate and 1.1 g of ethyleneglycol diglycidyl ether were heated at 200°-220° C. for 8 hours under argon stream.

The reaction mixture was purified by column chromatography (silica gel; ethyl acetate: ethanol: triethylamine = 20: 1: 1), giving pale yellow, viscous oil (Compound No. 22) having a mean molecular weight of 3,000 from the first eluate, and pale yellow viscous oil (Compound No. 23) having a mean molecular weight of 2,300 from the second eluate.

EXAMPLE 16

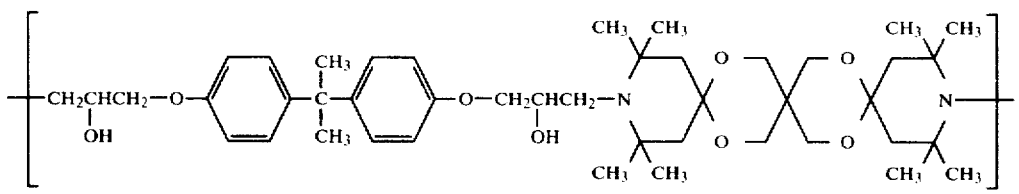

4.4 g of 2,2,4,4,14,14,16,16-octamethyl-7,11,18,21-tatraoxa-3,15-diazatrispiro[5.2.2.5.2.2.]heneicosane and 3.4 g of 2,2-bis[p-(2,3-epoxypropoxy)phenyl]propane were heated at 180° C. for 8 hours under nitrogen stream.

The reaction mixture was purified by column chromatography (silica gel; ethyl acetate: triethylamine = 9: 1), and the product was dissolved in benzene and precipitated with n-hexane, giving the desired compound (Compound No. 24) as white powder softening at 180°-200° C. and having a mean molecular weight of 3,450.

EXAMPLE 17

Acetate of Compound No. 24

2 g of the white powder obtained in Example 16 and 10 g of acetic anhydride were refluxed in 20 ml of benzene for 5 hours. The reaction mixture was washed with 10% potassium carbonate aqueous solution and the benzene layer was dried over potassium carbonate. The residue obtained by removing the solvent was purified by column chromatography (silica gel; ethyl acetate) and the obtained crude product was dissolved in benzene.

Precipitate formed by pouring the benzene solution to n-hexane was collected by filtration, giving white powder (Compound No. 25) softening at 155°-175° C. The IR and NMR spectra showed that the hydroxy groups have been completely acetylated.

EXAMPLE 18

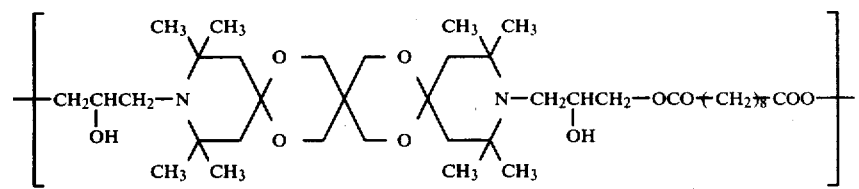

2.1 g of 3,15-bis(2,3-epoxypropyl)-2,2,4,4,14,14,16,16-octamethyl-7,11,18,21-tetraoxa-3,15-diaza-trispiro[5.2.2.5.2.2.]heneicosane and 0.8 g of sebacic acid were refluxed in a mixture of 10 ml of tert-butanol and 10 ml of toluene for 14 hours. After the solvent was removed under reduced pressure, the residue was purified by column chromatography (silica gel; ethyl acetate: methanol = 1: 1), giving the desired compound (Compound No. 26) as white powder softening at 149°-158° C. and having a mean molecular weight of 5,100.

EXAMPLE 19

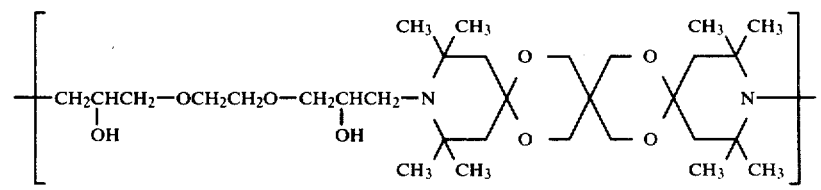

4.1 g of 2,2,4,4,14,14,16,16-octamethyl-7,11,18,21-tetraoxa-3,15-diazatrispiro[5.2.2.5.2.2.]heneicosane and 1.74 g of ethyleneglycol diglycidyl ether was heated at 200° C. in 4 ml of octanol for 20 hours, under stirring.

After the octanol was removed under reduced pressure, the residue was purified by column chromatography (silica gel; ethyl acetate: methanol: triethylamine =2: 2: 1), giving the desired compound (Compound No. 27) as pale yellow powder softening at 140°-154° C. and having a mean molecular weight of 2,770.

EXAMPLE 20

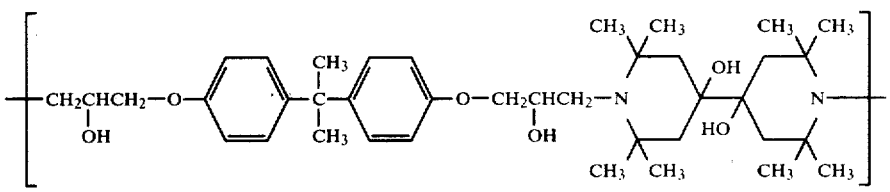

6.4 g of 4,4'-bis(2,2,6,6-tetramethyl-4-piperidinol) and 6.8 g of 2,2-bis[p-(2,3-epoxypropoxy)phenyl]propane were heated at 150°-160° C. in 80 ml of octanol for 8 hours, under stirring. After the octanol was removed under reduced pressure, the vitreous mass left was triturated, giving the desired compound (Compound No. 28) as white powder softening at 106°-109° C. and having a mean molecular weight of 1,850.

EXAMPLE 21

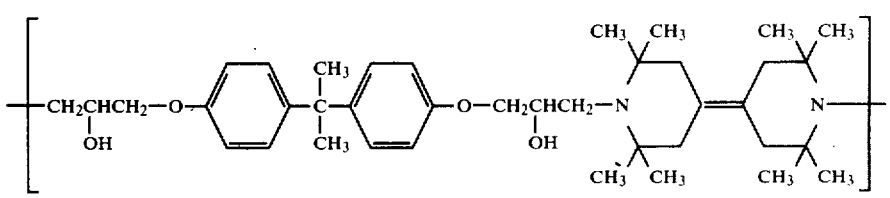

1.5 g of 2,2,2,',2',6,6,6',6'-octamethyl-4,4'-bipiperidilydene and 1.8 g of 2,2-bis[p-(2,3-epoxypropoxy) phenyl]propane was heated at 180°-220° C. for 2 hours under argon stream. The reaction mixture was dissolved in chloroform and methanol was added thereto, forming precipitate. The precipitate was collected by filtration, washed with methanol and dried under reduced pressure, giving the desired compound (Compound No. 29) as white solid softening at 170°-180° C. and having a mean molecular weight of 5,300.

EXAMPLE 22

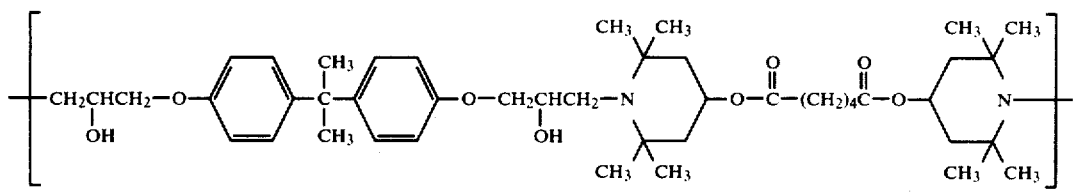

A mixture of 5.24 g of bis(2,2,6,6-tetramethyl-4-piperidyl) adipate and 4.2 g of 2,2-bis[p-(2,3-epoxypropoxy)-phenyl]propane was heated at 160°-170° C. for 6 hours under nitrogen stream. The reaction mixture was purified by column chromatography through silica gel eluted with ethyl acetate, giving the desired compound (Compound No. 30) in the form of a white powder softening at 95°-115° C. and having a mean molecular weight of 3,700.

EXAMPLE 23

A mixture of 4.8 g of N,N'-hexamethylenebis[N-(2,2,6,6-tetramethyl-4-piperidyl)acetamdie] and 2.6 g of bis(2,3-epoxypropyl) 1,4-butanedicarboxylate was heated at 200° C. for 3 hours under nitrogen stream. The reaction mixture was washed with hot n-hexane and dried under reduced pressure, affording the desired compound (Compound No. 32) in the form of a pale yellow powder softening at 50°-60° C. and having a mean molecular weight of 2020.

EXAMPLE 25

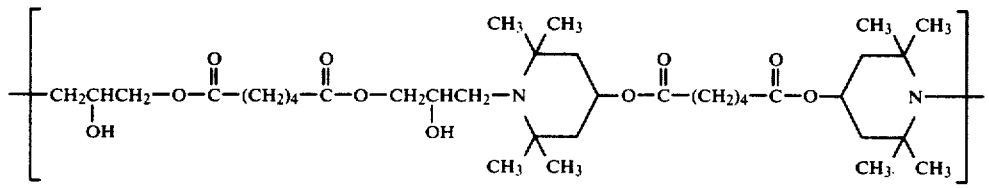

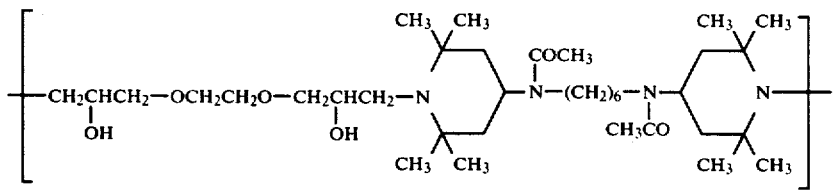

A mixture of 8.5 g of bis(2,2,6,6-tetramethyl-4-piperidyl) adipate and 5.2 g of bis(2,3-epoxypropyl) 1,4-butanedicarboxylate was heated at 160°-170° C. for 4 hours under nitrogen stream. The reaction mixture was dissolved in ethyl acetate and the solution was poured into n-hexane, affording an oily substance which is insoluble in n-hexane. The oily substance was dried under reduced pressure, affording the desired compound (Compound No. 31) in the form of a colorless solid softening at 97°-115° C. and having a mean molecular weight of 3,700.

EXAMPLE 24

A mixture of 4.8 g of N,N'-hexamethylenebis[N-(2,2,6,6-tetramethyl-4-piperidyl)acetamide] and 1.74 g of ethylene glycol diglycidyl ether was heated at 250° C. for 1 hour under nitrogen stream. The reaction mixture was dissolved in benzene and the solution was poured into n-hexane to give a precipitate.

The precipitate was collected by filtration and dried under reduced pressure, affording the desired compound (Compound No. 33) in the form of a pale yellow powder softening at 85°-95° C. and having a mean molecular weight of 2,360.

EXAMPLE 26

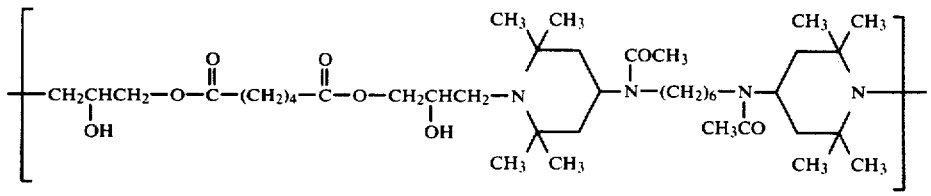

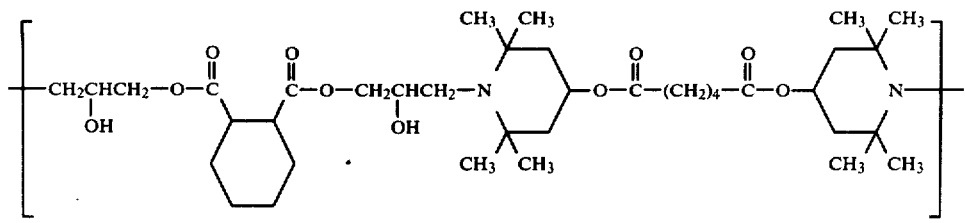

A mixture of 4.25 g of bis(2,2,6,6-tetramethyl-4-piperidyl) adipate and 2.84 g of bis(2,3-epoxypropyl) 1,2-cyclohexanedicarboxylate was heated at 170°-180° C. for 16 hours under argon stream. The reaction mixture was dissolved in benzene and the solution was poured into n-hexane to give a precipitate. The precipitate was collected by filtration and dried under reduced pressure, affording the desired compound (Compound No. 34) in the form of a colorless solid softening at 89°-95° C. and having a mean molecular weight of 4,530.

A mixture of 3.5 g of bis(2,2,6,6-tetramethyl-4-piperidyl) isophthalate and 2.2 g of bis(2,3-epoxypropyl) 1,2-cyclohexanedicarboxylate was heated at 180° C. for 7 hours under nitrogen stream. The reaction mixture was dissolved in benzene and the solution was poured into n-hexane to give a precipitate, which was collected by filtration and dried under reduced pressure, affording the desired compound (Compound No. 36) in the form of a white powder softening at 94°-104° C. and having a mean molecular weight of 1,660.

EXAMPLE 29

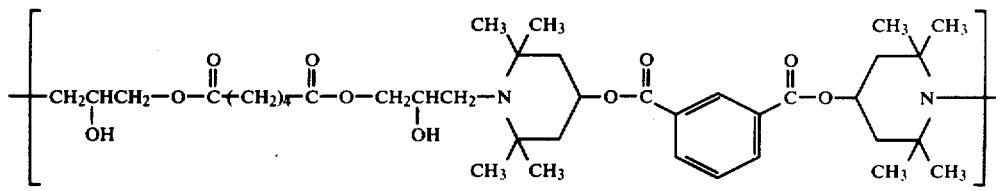

EXAMPLE 27

A mixture of 3.5 g of bis(2,2,6,6-tetramethyl-4-piperi-

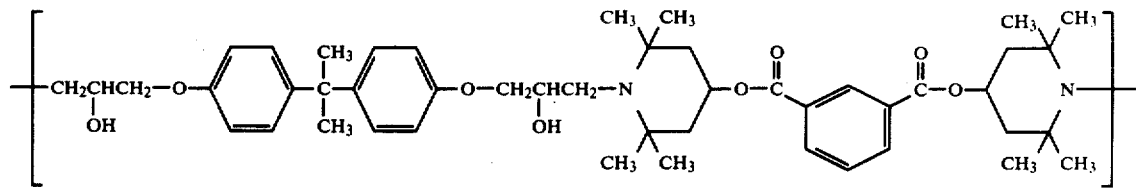

A mixture of 3.0 g of bis(2,2,6,6-tetramethyl-4-piperidyl) isophthalate and 2.3 g of bis[p-(2,3-epoxypropoxy)-phenyl]-propane was heated at 180° C. for 7 hours under nitrogen stream. The reaction mixture was dissolved in benzene and the solution was poured into n-hexane to give a precipitate.

The precipitate was collected by filtration and dried under reduced pressure to give the desired compound (Compound No. 35) in the form of a white powder softening at 155°-165° C. and having a mean molecular weight of 4,270.

EXAMPLE 28 dyl) isophthalate and 2.0 g of bis(2,3-epoxypropoxy) adipate was heated at 180° C. for 7 hours under nitrogen stream. The reaction mixture was dissolved in benzene and the solution was filtered and poured into n-hexane to give a precipitate.

The precipitate was collected by filtration and dried under reduced pressure to give the desired compound (Compound No. 37) in the form of a pale yellow powder softening at 90°-100° C. and having a mean molecular weight of 3,000.

EXAMPLE 30

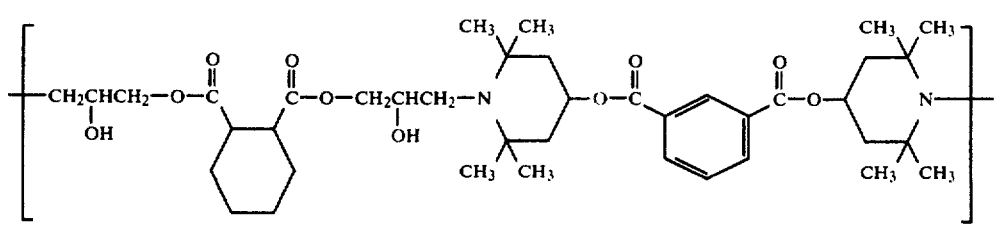

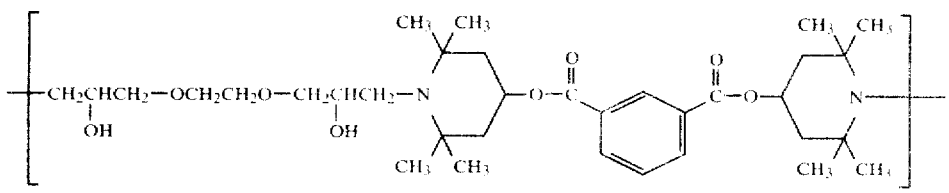

A mixture of 3.5 g of bis(2,2,6,6-tetramethyl-4-piperidyl) isophthalate and 1.4 g of ethylene glycol diglycidyl ether was heated at 180° C. for 7 hours under nitrogen stream.

The reaction mixture was dissolved in benzene and the solution was poured into n-hexane to give a precipitate. The precipitate was collected by filtration and dried under reduced pressure, affording the desired compound (Compound No. 38) in the form of a pale yellow powder softening at 98°–105° C. and having a mean molecular weight of 3,200.

EXAMPLE 31

Stabilization of polypropylene

Mixtures were made from 100 parts of unstabilized polypropylene powder (MFI=18), 0.2 part of stearyl 3-(3,5-di-tert-butyl-4-hydroxyphenyl)propionate as an antioxidant, and 0.25 part of the stabilizer compounds of the invention. The mixtures were blended and homogenized with a Brabender Plastograph at 200° C. for 10 minutes and the formed mass was pressed to a sheet of 2–3 mm thick with a laboratory press. The sheet was pressed with a hydraulic press at 260° C. for 6 minutes (12 tons) and put immediately into cold water to form a film of 0.5 mm thick, from which a film of 0.1 mm thick was obtained by the same procedures.

The film was cut into test specimens of 50×120 mm. The test specimens were exposed to light in a Sunshine Weather Meter at a black panel temperature of 63°±3° C. and examined periodically to determine the percentage of elongation at brake. The test results were expressed as a ratio of the time required for the test specimens to reach 50% elongation at brake when a stabilizer was used to the time required for the test specimens to reach 50% elongation at brake when no stabilizer was used. The results are shown in Table 1.

TABLE 1.

| Compound No. | Ratio |
|---|---|
| 1 | 7.8 |
| 2 | 7.2 |
| 3 | 7.4 |
| 5 | 5.4 |
| 8 | 6.1 |
| 10 | 4.8 |
| 14 | 7.1 |
| 17 | 6.8 |
| 19 | 6.0 |
| 20 | 7.7 |
| 21 | 6.2 |
| 22 | 7.8 |
| 27 | 6.4 |
| 28 | 4.3 |
| 29 | 4.4 |
| 30 | 5.0 |
| 31 | 7.1 |
| 32 | 5.3 |
| 33 | 5.9 |
| 34 | >6.7 |

EXAMPLE 32

Stabilization of polystyrene

Mixtures were made from 100 parts of polystyrene ("Styron 666", trade name of Asahi Dow Co., Ltd.) and 0.25 part of each in turn of the stabilizers indicated in Table 2.

The resulting mixtures were blended and homogenized by means of a Brabender Plastograph at 200° C. for 5 minutes, then compression-molded at 180° C. for 2 minutes, forming sheets of thickness 1.5 mm.

Each test sheet was exposed to light in a Xenon Weather-O-Meter (6.5 kw; ASTM G26-77) for 1500 hours and the yellowness index of the sheet before and after irradiation was determined in accordance with ASTM D1925. The results are shown in Table 2.

TABLE 2.

| | Yellowness Index | |
|---|---|---|
| Compound No. | Before irradiation | After irradiation |
| 2 | 1.9 | 7.1 |
| 8 | 1.8 | 8.7 |
| 10 | 2.0 | 8.6 |
| 17 | 2.2 | 10.2 |
| 19 | 1.8 | 10.8 |
| 20 | 1.7 | 8.3 |
| 22 | 1.9 | 9.5 |
| 28 | 2.1 | 10.4 |
| None | 1.8 | 35.2 |

EXAMPLE 33

Stabilization of polyurethane

Mixtures were made from 10 g of polyurethane ("Paraprene 22S", trade name of Nippon Polyurethane Kogyo KK) and 0.05g of each in turn of the stabilizers of the invention indicated in Table 3. Each mixture was dissolved in 30 ml of dimethylformamide and the resulting solution was drawn on a glass plate to form a sheet of thickness 0.4 mm. The sheets were maintained at 60° C. for 20 minutes and dried at 120° C. for 15 minutes to cast films of thickness 0.1 mm. The films thus obtained were exposed to ultraviolet radiation in a Sunshine Carbon Arc Lamp Weather Meter (type "WEL-SUN-HC", trade name of Suga Test Instruments Co., Ltd.) for 300 hours and the yellowness index before and after irradiation was determined in accordance with ASTM D1925. The results are shown in Table 3.

TABLE 3.

| | Yellowness Index | |
|---|---|---|
| Compound No. | Before Irradiation | After Irradiation |
| 2 | 1.5 | 23.7 |
| 8 | 1.9 | 25.5 |
| 10 | 1.7 | 22.8 |
| 17 | 2.0 | 26.5 |
| 19 | 1.6 | 23.1 |
| 20 | 1.8 | 21.9 |
| 22 | 1.6 | 22.8 |

TABLE 3.-continued

| Compound No. | Yellowness Index | |
|---|---|---|
| | Before Irradiation | After Irradiation |
| None | 1.5 | 47.6 |

What is claimed is:

1. A polymer represented by the formula (I):

$$\text{+CH}_2\text{CHCH} \text{$\not\!$}\text{X—CH}_2\text{CHCH}_2 \text{$\rightarrow_{\overline{m_1}}$}\text{Y+CH}_2\text{CHCH}_2 \text{—X} \text{$\rightarrow_{\overline{m_2}}\!\!_{\overline{l}}$} \quad \text{(I)}$$
$$\phantom{xxxx}\text{OZ} \phantom{xxxxxxxx} \text{OZ} \phantom{xxxxxxxxxxx} \text{OZ}$$

wherein;

$l$ is an integer of from 2 to 50, $m_1$ and $m_2$ are 0, or one of them is 1 and another is 0, X represents a group of formula —OCH$_2$CHCH$_2$O—, —O+CH$_2$CHO$\rightarrow_{\overline{n_1}}$ or
$\phantom{xxx}$ | $\phantom{xxxxxxxxxx}$ |
$\phantom{xxx}$ OZ $\phantom{xxxxxxxxxx}$ R$_0$ —OWO+CH$_2$CHCH$_2$—OWO$\rightarrow_{\overline{n_2}}$,
$\phantom{xxxxxxxxx}$ |
$\phantom{xxxxxxxxx}$ OZ in which:

R$_0$ is hydrogen atom or methyl group,
$n_1$ is an integer of from 1 to 10,
$n_2$ is 0 or an integer of from 1 to 10,
W represents a group of formula

[diagram of diphenyl with C(CH$_3$)$_2$ bridge]

[diagram of dicyclohexyl with C(CH$_3$)$_2$ bridge]

[diagram of diphenyl with CH$_2$ bridge], —CO+CH$_2$)$_{\overline{n_3}}$—CO—,

—CO⟨benzene⟩CO— or —CO⟨cyclohexane⟩CO—, in which $n_3$ is an integer of from 1 to 10, and, Z has the meaning defined below, Y represents, when $m_1$ and $m_2$ are 0, a group of following formulae II to IV:

(II)
[structure showing piperidine ring with R$_1$CH$_2$, CH$_3$, R$_1$ substituents and N—C(=O)—N—R$_2$ group]

in which:

R$_1$ represents hydrogen atom or methyl group,
R$_2$ represents hydrogen atom or an alkyl group having from 1 to 18 carbon atoms, (III)
[structure showing piperidine ring with R$_1$CH$_2$, CH$_3$, R$_1$ substituents and —O— group]

in which:

R$_1$ has the meaning defined above, (IV)
[structure showing piperidine ring with R$_1$CH$_2$, CH$_3$, R$_1$ substituents and spiro O—R$_3$—CH$_2$O— group]

in which:

R$_1$ has the meaning defined above,
R$_3$ represents a group of formula

—CH$_2$ or —CH$_2$\
$\phantom{xxxx}$|$\phantom{xxxxxxx}$C(R$_4$)
—CH— $\phantom{xxxx}$—CH$_2$/ in which,

R$_4$ represents methyl group or ethyl group, and,

Y represents, when one of $m_1$ and $m_2$ is 1 and another is 0, a group of following formulae V to XI:

(V)
[structure showing two piperidine rings linked by N—A—N with carbonyl groups and R$_2$ substituents]

in which:

R$_1$ and R$_2$ have the meanings defined above,

A represents an alkylene group having from 2 to 12 carbon atoms, xylylene group, a group of formula —CH$_2$—⟨biphenyl⟩—CH$_2$—, —CH$_2$COO—R$_5$—OCOCH$_2$—, —CH$_2$CHO—R$_7$—OCHCH$_2$— or
$\phantom{xxx}$|$\phantom{xxxxxxxxx}$|
$\phantom{xxx}$R$_6$ $\phantom{xxxxxxxx}$R$_6$ —CH$_2$CHCH$_2$—(R$_8$—CH$_2$CHCH$_2$)$_{\overline{p}}$—
$\phantom{xxxxxx}$|$\phantom{xxxxxxxxxxxx}$|
$\phantom{xxxxxx}$OZ $\phantom{xxxxxxxxxxxx}$OZ in which, R$_5$ represents an alkylene group having from 2 to 8 carbon atoms, R$_6$ represents hydrogen atom, methyl group or phenyl group, R$_7$ represents an aliphatic, aromatic or alicyclic diacyl group having up to 12 carbon atoms, R$_8$ has the same meaning as above defined X, p is 0 or 1, and Z has the meaning defined below,

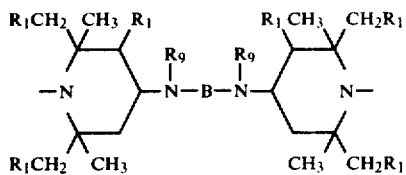
(VI)

in which:

R₁ has the meaning defined above,

R₉ represents an alkyl group having from 1 to 18 carbon atoms, phenyl group, benzyl group, cyclohexyl group, or an aliphatic, aromatic, araliphatic or alicyclic acyl group having up to 18 carbon atoms, B represents an alkylene group having from 2 to 10 carbon atoms, xylylene group a group of formula

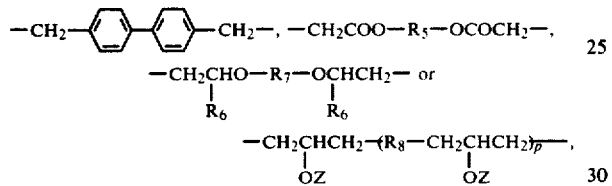

in which,

R₅, R₆, R₇, R₈ and p have the meanings defined above, and

Z has the meaning defined below,

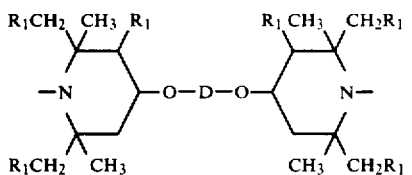
(VII)

in which:

R₁ has the meaning defined above,

D represents an aliphatic, aromatic, araliphatic or alicyclic diacyl group having up to 36 carbon atoms or a group of formula —CONH—R₁₀—NHCO— in which, R₁₀ represents an alkylene group having from 2 to 10 carbon atoms, a phenylene group optionally substituted with methyl, a napthylene group, a xylylene group, a cyclohexylene group optionally substituted with methyl, a group of formula

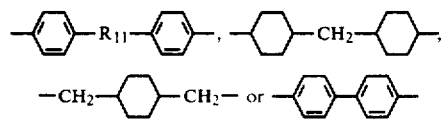

in which,

R₁₁ represents oxygen atom or methylene group,

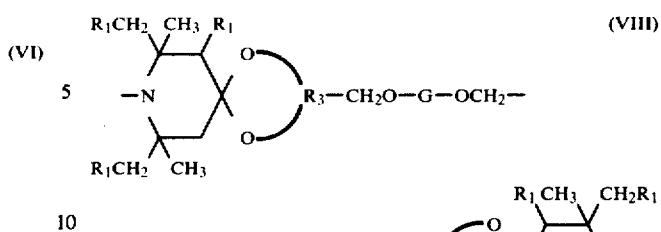
(VIII)

in which: R₁ and R₃ have the meanings defined above, G has the same meaning as above-defined D, or represents an alkylene group having from 3 to 10 carbon atoms, a xylylene group, a group of formula

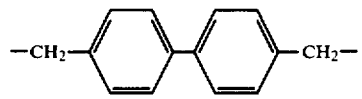

or a group of formula

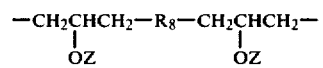

in which,

R₈ has the meaning defined above, and,

Z has the meaning defined below,

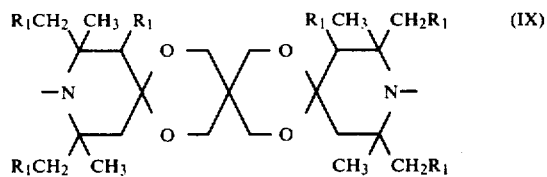
(IX)

in which: R₁ has the meaning defined above,

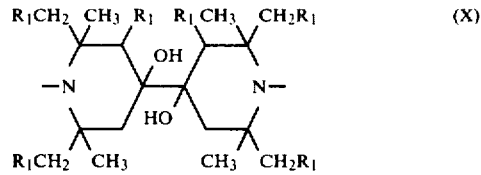
(X)

in which: R₁ has the meaning defined above,

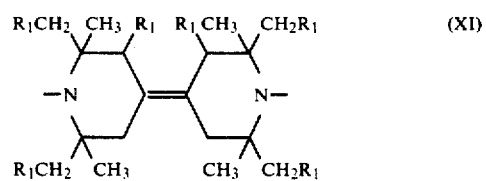
(XI)

in which: $R_1$ has the meaning defined above, and, all of Z in the molecule represent hydrogen atom, an alkyl group having from 1 to 18 carbon atoms, an aliphatic, aromatic, araliphatic or alicyclic acyl group having up to 18 carbon atoms or a group of formula —CONHR$_{12}$ in which, $R_{12}$ represents an alkyl group having from 1 to 18 carbon atoms, phenyl group or cyclohexyl group, or a part of Z represent hydrogen atom and the remaining Z represent above-defined groups other than hydrogen atom.

2. A polymer as claimed in claim 1, wherein Y is a group of formula (II) to (DI) and $R_1$ is hydrogen atom.

3. A polymer as claimed in claim 2, wherein both $m_1$ and $m_2$ are 0, Y is a group of formula (II) in which $R_1$ and $R_2$ are hydrogen atoms.

4. A polymer as claimed in claim 2, wherein both $m_1$ and $m_2$ are 0, Y is a group of formula (III) in which $R_1$ is hydrogen atom.

5. A polymer as claimed in claim 2, wherein both $m_1$ and $m_2$ are 0, Y is a group of formula (IV) in which $R_1$ is hydrogen atom.

6. A polymer as claimed in claim 2, wherein one of $m_1$ and $m_2$ is 1 and another is 0, X is a group of formula —OCH$_2$CH$_2$O— or —OWO— in which, W is a group of formula

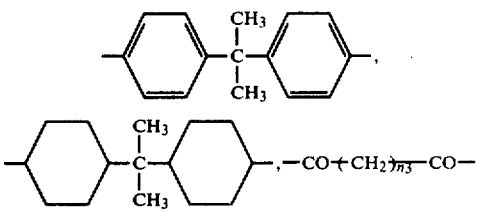

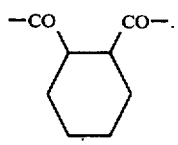

($n_3$ is an integer of from 4 to 10) or

7. A polymer as claimed in claim 6, wherein Y is a group of formula (V) in which $R_1$ and $R_2$ are hydrogen atoms and A is an alkylene group having from 2 to 6 carbon atoms or a group of formula

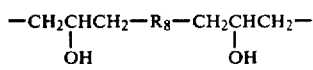

($R_8$ has the same meaning as X).

8. A polymer as claimed in claim 6, wherein Y is a group of formula (VI) in which $R_1$ is hydrogen atom, and $R_9$ is an alkanoyl group having from 2 to 4 carbon atoms or an alkyl group having from 1 to 8 carbon atoms and B is an alkylene group having from 2 to 6 carbon atoms, or $R_9$ is an alkyl group having from 1 to 8 carbon atoms and B is a group of formula

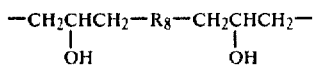

($R_8$ has the same meaning as X).

9. A polymer as claimed in claim 6, wherein Y is a group of formula (VII) in which $R_1$ is hydrogen atom and D is an alkanedicarbonyl group having from 4 to 12 carbon atoms or a group of formula

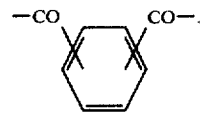

10. A polymer as claimed in claim 6, wherein Y is a group of formula (VIII) in which $R_1$ is hydrogen atom and G is an alkanedicarbonyl group having from 4 to 12 carbon atoms or a group of formula

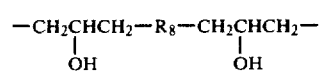

($R_8$ has the same meaning as X).

11. A polymer as claimed in claim 6, wherein Y is a group of formula (IX), (X) or (XI) in which $R_1$ is hydrogen atom.

12. A polymer as claimed in any one of claims 7 to 11, wherein X is a group of formula

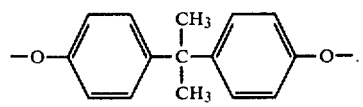

13. A polymer as claimed in claim 1, wherein all of Z in the molecule are hydrogen atom.

14. A polymer as claimed in claim 1, wherein all of Z in the molecule are acetyl groups or benzoyl groups, or a part of Z are hydrogen atom and the remaining Z are acetyl groups or benzoyl groups.

15. A polymer as claimed in claim 1, wherein l is an integer of from 2 to 10.

16. A synthetic polymer composition stabilized against light- and heat degradation thereof, which is characterized in that there is incorporated into a synthetic polymer to be stabilized from 0.01 to 5.0% by weight of said synthetic polymer of at least one polymer represented by the formula (I):

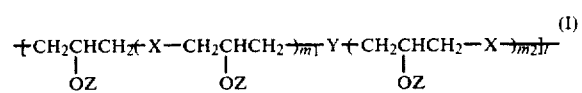

wherein;
l is an integer of from 2 to 50,
$m_1$ and $m_2$ are 0, or one of them is 1 and another is 0,
X represents a group of formula

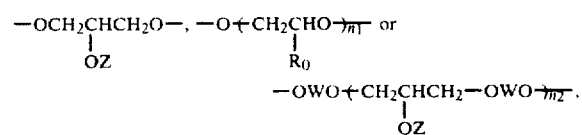

in which:
$R_0$ is hydrogen atom or methyl group,
$n_1$ is an integer of from 1 to 10, $n_2$ is 0 or an integer of from 1 to 10, W represents a group of formula

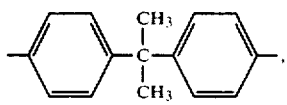

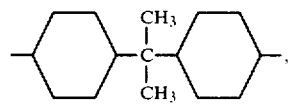

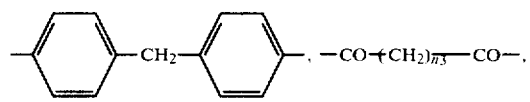

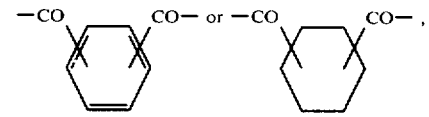

in which $n_3$ is an integer of from 1 to 10, and,

Z has the meaning defined below,

Y represents, when $m_1$ and $m_2$ are 0, a group of following formulae II to IV:

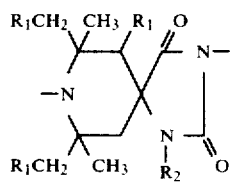  (II)

in which:

$R_1$ represents hydrogen atom or methyl group, $R_2$ represents hydrogen atom or an alkyl group having from 1 to 18 carbon atoms,

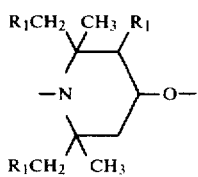  (III)

in which:

$R_1$ has the meaning defined above,

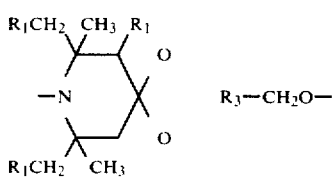  (IV)

in which $R_1$ has the meaning defined above, $R_3$ represents a group of formula

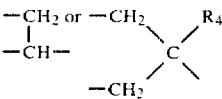

in which, $R_4$ represents methyl group or ethyl group, and,

Y represents, when one $m_1$ and $m_2$ as 1 and another is 0, a group of following formulae V to XI:

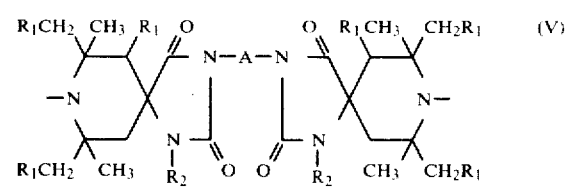  (V)

in which:

$R_1$ and $R_2$ have the meanings defined above,

A represents an alkylene group having from 2 to 12 carbon atoms, xylylene group, a group of formula

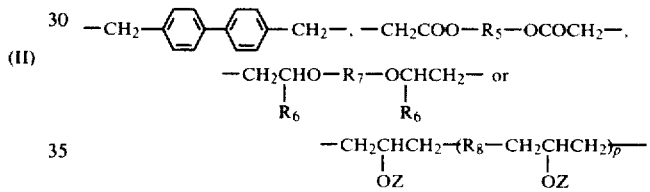

in which, $R_5$ represents an alkylene group having from 2 to 8 carbon atoms, $R_6$ represents hydrogen atom, methyl group or phenyl group, $R_7$ represents an aliphatic, aromatic or alicyclic diacyl group having up to 12 carbon atoms, $R_8$ has the same meaning as above defined X, p is 0 or 1, and Z has the meaning defined below,

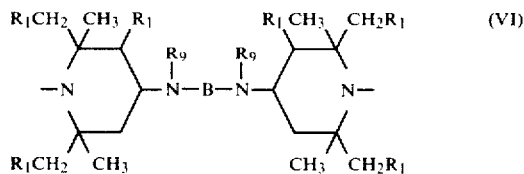  (VI)

in which:

$R_1$ has the meaning defined above, $R_9$ represents an alkyl group having from 1 to 18 carbon atoms, phenyl group, benzyl group, cyclohexyl group, or an aliphatic, aromatic, araliphatic or alicyclic acyl group having up to 18 carbon atoms, B represents an alkylene group having from 2 to 10 carbon atoms, xylylene group a group of formula

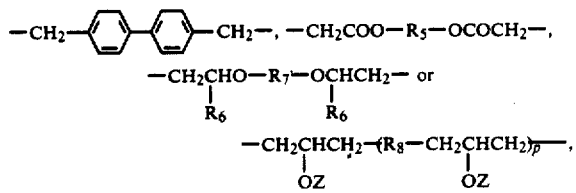, $-CH_2COO-R_5-OCOCH_2-$, $-CH_2CHO-R_7-OCHCH_2-$ or
         |              |
         $R_6$          $R_6$ $-CH_2CHCH_2-(R_8-CH_2CHCH_2)_{\overline{p}}-$,
       |              |
       OZ             OZ in which, $R_5$, $R_6$, $R_7$, $R_8$ and p have the meanings defined above, and Z has the meaning defined below,

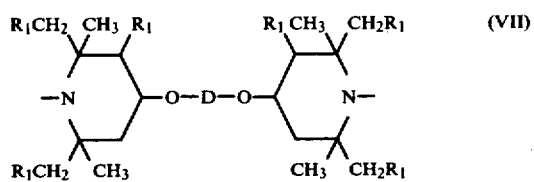 (VII)

in which $R_1$ has the meaning defined above,

D represents an aliphatic, aromatic, araliphatic or alicyclic diacyl group having up to 36 carbon atoms or a group of formula $-CONH-R_{10}-NHCO-$ in which, $R_{10}$ represents an alkylene group having from 2 to 10 carbon atoms, a phenylene group optionally substituted with methyl, a naphthylene group, a xylylene group, a cyclohexylene group optionally substituted with methyl, a group of formula

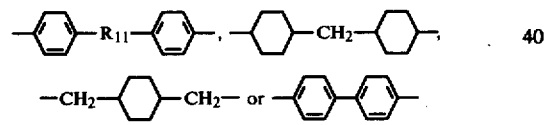

in which, $R_{11}$ represents oxygen atom or methylene group,

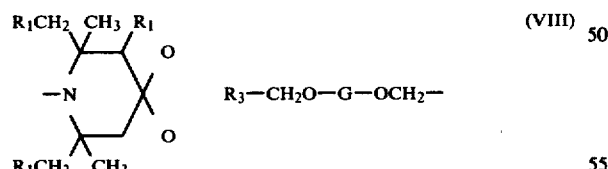 (VIII)

$R_3-CH_2O-G-OCH_2-$

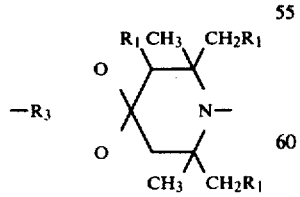
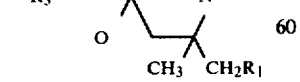

in which: $R_1$ and $R_3$ have the meanings defined above, G has the same meaning as above-defined D, or represents an alkylene group having from 3 to 10 carbon atoms, a xylylene group, a group of formula

or a group of formula

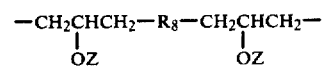

in which, $R_8$ has the meaning defined above, and,

Z has the meaning defined below,

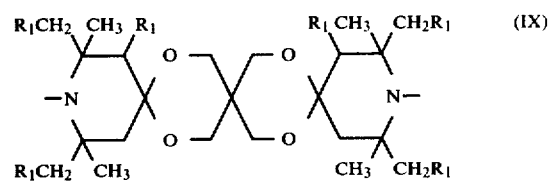 (IX)

in which: $R_1$ has the meaning defined above,

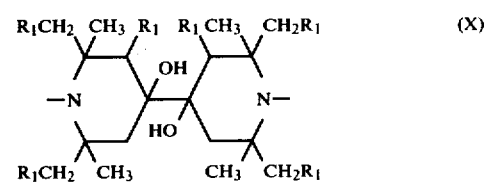 (X)

in which: $R_1$ has the meaning defined above,

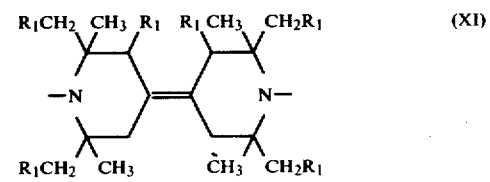 (XI)

in which: $R_1$ has the meaning defined above, and, all of Z in the molecule represent hydrogen atom, an alkyl group having from 1 to 18 carbon atoms, an aliphatic, aromatic, araliphatic or alicyclic acyl group having up to 18 carbon atoms or a group of formula $-CONHR_{12}$ in which, $R_{12}$ represents an alkyl group having from 1 to 18 carbon atoms, phenyl group or cyclohexyl group, or a part of Z represent hydrogen atom and the remaining Z represent above-defined groups other than hydrogen atom.

17. A synthetic polymer composition as claimed in claim 16, wherein the synthetic polymer is an olefin or diene polymer, styrene polymer or polyurethane.

18. A polymer represented by the formula (I):

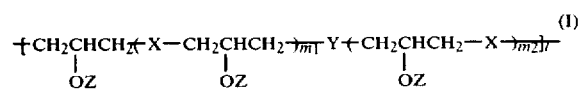 (I)

wherein;
 l is an integer of from 2 to 10,
 one of $m_1$ or $m_2$ is 1 and another is 0,
 X represents a group of formula

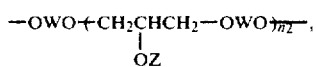

in which;
 $n_2$ is 0 or an integer of from 1 to 10
 W represents a group of formula

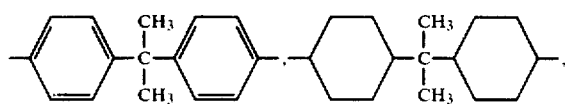

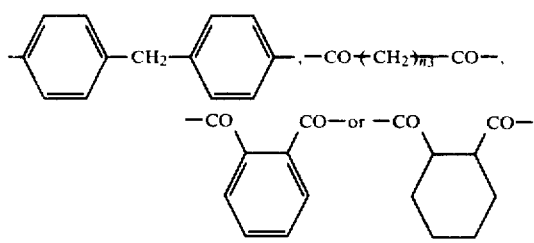

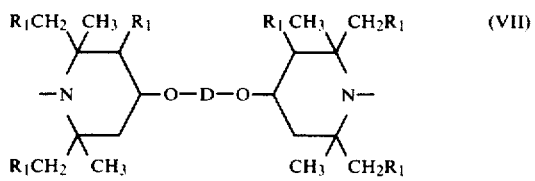

in which; $n_3$ is an integer of from 1 to 10,
Z has the meaning defined below,
Y represents a group of formula (VII);

$$\overset{R_1CH_2\ \ CH_3\ \ R_1}{\underset{R_1CH_2\ \ CH_3}{\diagup\!\!\diagdown}}\!\!\!-\!\!N\!\!\!-\!\!\!\overset{}{\underset{}{\diagup\!\!\diagdown}}\!\!\!-\!\!O\!\!-\!\!D\!\!-\!\!O\!\!-\!\!\overset{}{\underset{}{\diagup\!\!\diagdown}}\!\!\!-\!\!N\!\!\!-\!\!\!\overset{R_1\ CH_3\ \ CH_2R_1}{\underset{CH_3\ \ CH_2R_1}{\diagup\!\!\diagdown}} \qquad (VII)$$

in which;
 $R_1$ represents hydrogen atom or methyl group,
 D represents an aliphatic, aromatic, araliphatic or alicyclic diacyl group having up to 36 carbon atoms or a group of formula —CONH—$R_{10}$—NHCO— in which; $R_{10}$ represents an alkylene group having from 2 to 10 carbon atoms, a phenylene group optionally substituted with methyl, a naphthylene group, a xylylene group, a cyclohexylene group optionally substituted with methyl, a group of formula

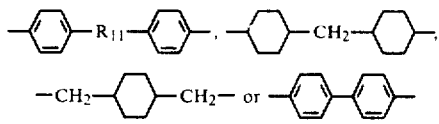

in which; $R_{11}$ represents oxygen atom or methylene group, and, all of Z in the molecule represent hydrogen atom, an alkyl group having from 1 to 18 carbon atoms, an aliphatic, aromatic, araliphatic or alicyclic acyl group having up to 18 carbon atoms or a group of formula —CONHR$_{12}$ in which; $R_{12}$ represents an alkyl group having from 1 to 18 carbon atoms, phenyl group or cyclohexyl group, or a part of Z represent hydrogen atom and the remaining Z represent above-defined groups other than hydrogen atom.

19. A polymer as claimed in claim 18, wherein $R_1$ is hydrogen atom.

20. A polymer as claimed in claim 19, wherein X is a group of formula —OWO— in which; W is a group of formula

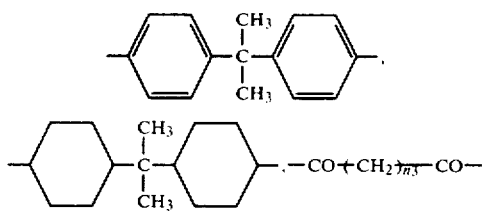

($n_3$ is an integer of from 4 to 10) or

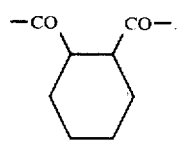

21. A polymer as claimed in claim 20, wherein $R_1$ is hydrogen atom and D is an alkanedicarbonyl group having from 4 to 12 carbon atoms or a group of formula

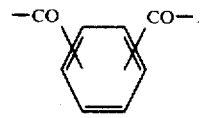

22. A polymer as claimed in claim 21, wherein W and D are groups of formula —CO(CH$_2$)$_{n3}$CO— in which $n_3$ is an integer of from 4 to 10.

23. A polymer as claimed in claim 18, wherein all of Z in the molecule are hydrogen atoms.

24. A polymer as claimed in claim 18, wherein all of Z in the molecule are acetyl groups or benzoyl groups, or a part of Z are hydrogen atoms and the remaining Z are acetyl groups or benzoyl groups.

25. A compound as claimed in claim 18 having the following structure;

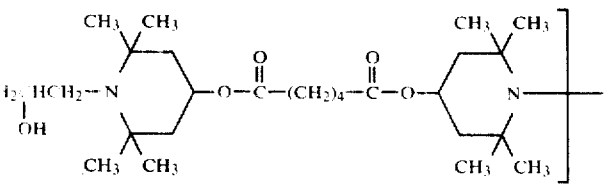

26. A synthetic polymer composition stabilized against light- and heat degradation thereof, which is characterized in that there is incorporated into a synthetic polymer to be stabilized from 0.01 to 5.0% by weight of said synthetic polymer at least one polymer represented by formula (I) in claim 18.

27. A synthetic polymer composition as claimed in claim 26, wherein the synthetic polymer is an olefin or diene polymer.